(12) United States Patent
Wild et al.

(10) Patent No.: US 11,846,526 B2
(45) Date of Patent: Dec. 19, 2023

(54) SENSOR SYSTEM

(71) Applicants: Jason Michael Wild, Denver, CO (US); Jacob Anthony Baldwin, Boulder, CO (US); Scott David Dalgleish, Boulder, CO (US); David Scott Kramer, Erie, CO (US)

(72) Inventors: Jason Michael Wild, Denver, CO (US); Jacob Anthony Baldwin, Boulder, CO (US); Scott David Dalgleish, Boulder, CO (US); David Scott Kramer, Erie, CO (US)

(73) Assignee: Phase IV Engineering Inc., Boulder, CO (US)

( * ) Notice: Subject to any disclaimer, the term of this patent is extended or adjusted under 35 U.S.C. 154(b) by 15 days.

(21) Appl. No.: 17/670,473

(22) Filed: Feb. 13, 2022

(65) Prior Publication Data

US 2022/0174377 A1    Jun. 2, 2022

Related U.S. Application Data

(62) Division of application No. 16/881,246, filed on May 22, 2020, now Pat. No. 11,490,175.
(Continued)

(51) Int. Cl.
| | | |
|---|---|---|
| *G01D 21/00* | (2006.01) | |
| *H04Q 9/00* | (2006.01) | |

(Continued)

(52) U.S. Cl.
CPC ............ *G01D 21/00* (2013.01); *G01D 9/005* (2013.01); *G06F 16/2255* (2019.01);
(Continued)

(58) Field of Classification Search
CPC .......... H04Q 2209/00; H04Q 2209/10; H04Q 2209/20; H04Q 2209/40; H04Q 2209/43;
(Continued)

(56) References Cited

U.S. PATENT DOCUMENTS

| | | |
|---|---|---|
| 5,377,128 A | 12/1994 | McBean |
| 6,683,553 B1 | 1/2004 | Pai |

(Continued)

FOREIGN PATENT DOCUMENTS

GB    2254943 A  * 10/1992  ............... H04Q 9/00

*Primary Examiner* — Franklin D Balseca
(74) *Attorney, Agent, or Firm* — Kenneth Altshuler

(57) ABSTRACT

Described are systems and methods to provide agnostic sensor data obtained from a sensor and transmitted to a central database by a transmitter device. In one aspect, a value sensed by a sensor component is converted at the transmitter device to an agnostic value defined by a dimensionless universal scale and offset. The agnostic value is then sent to a data acquisition database where it is converted back to the original value. This is accomplished by first providing the data acquisition database with a sensor definition of a scale and offset used to convert the sensor values in addition to any sensor indicia and other parameters to display the data acquired at the data acquisition database. The wireless sensors database and user interface are also automatically updated when a new sensor type is attached to the network utilizing configuration data that resides in the new sensor that is sent to the database on its first connection.

19 Claims, 18 Drawing Sheets

Related U.S. Application Data

(60) Provisional application No. 62/855,756, filed on May 31, 2019.

(51) Int. Cl.
   *G01D 9/00* (2006.01)
   *G06F 16/22* (2019.01)
   *H04L 67/1097* (2022.01)

(52) U.S. Cl.
   CPC .......... *H04L 67/1097* (2013.01); *H04Q 9/00* (2013.01); *H04Q 2209/43* (2013.01)

(58) Field of Classification Search
   CPC .......... H04Q 2209/70; H04Q 2209/80; H04Q 2209/82; H04Q 2209/826; H04Q 9/00; G01D 21/00; G01D 9/005; G06F 16/2255; H04L 67/1097
   See application file for complete search history.

(56) References Cited

U.S. PATENT DOCUMENTS

| | | | |
|---|---|---|---|
| 7,965,208 B2 | 6/2011 | McLoughlin | |
| 9,133,019 B2* | 9/2015 | McCleland | G06F 13/4282 |
| 2005/0172220 A1 | 8/2005 | Humphrey et al. | |
| 2006/0075248 A1 | 4/2006 | Westhoff et al. | |
| 2006/0248249 A1 | 11/2006 | Juelfs et al. | |
| 2013/0198245 A1 | 8/2013 | Kagan et al. | |
| 2016/0179912 A1 | 6/2016 | Bowman et al. | |
| 2017/0039477 A1* | 2/2017 | Savell | G06N 7/01 |
| 2017/0372251 A1 | 12/2017 | Sick | |
| 2018/0084073 A1 | 3/2018 | Walsh et al. | |

* cited by examiner

900

| Device ID | Timestamp | Component Index | Sensor Index | Sensor Value Index | Reading Value | Reading Value Status |
|---|---|---|---|---|---|---|
| 1050 | 4/19/19 01:00 | 0 | 0 | 0 | 40 | OK |
| 1050 | 4/19/19 01:00 | 1 | 0 | 0 | 39.7392 | OK |
| 1050 | 4/19/19 01:00 | 1 | 0 | 1 | -104.9903 | OK |
| 1060 | 4/19/19 01:10 | 0 | 0 | 0 | 60 | OK |
| 1060 | 4/19/19 01:10 | 0 | 1 | 0 | 450 | OK |
| 1060 | 4/19/19 01:10 | 1 | 0 | 0 | 30.2345 | OK |
| 1060 | 4/19/19 01:10 | 1 | 0 | 1 | 60.5678 | OK |
| 1060 | 4/19/19 01:10 | 1 | 1 | 0 | 82 | OK |
| 1050 | 4/19/19 01:15 | 0 | 0 | 0 | 45 | OK |
| 1050 | 4/19/19 01:15 | 1 | 0 | 0 | 39.7392 | OK |
| 1050 | 4/19/19 01:15 | 1 | 0 | 1 | -104.9903 | OK |

FIG. 10B

SENSOR SYSTEM

CROSS-REFERENCE TO RELATED APPLICATIONS

This application is a divisional patent application of U.S. application Ser. No. 16/881,246 entitled SENSOR SYSTEM filed on May 22, 2020, which claims priority to and the benefit of U.S. Provisional Patent Application No. 62/855,756 entitled: AGNOSTIC SENSOR TRANSMISSION, filed on May 31, 2019.

FIELD OF THE INVENTION

The present embodiments are generally directed to sensor components that each possess a corresponding sensor definition usable to construct a database capable of acquiring generic input information from the sensor in a usable format.

DESCRIPTION OF RELATED ART

Due in part to the information age, more objects and environments are monitored with sensors than ever before. Today's sensors come in a myriad of sizes and shapes providing a wide range of information about objects and environments, the information often being sent over the airways and through networks to remote viewers. It is to innovations related to this subject matter that the claimed invention is generally directed.

SUMMARY OF THE INVENTION

The present invention is generally directed to a sensor component that possesses a corresponding sensor definition usable to construct a database capable of acquiring generic input information from the sensor in a usable format. In addition, certain embodiments envision accessing and changing sensor definition/s in the master database via user configurable fields accessible by an end-user.

One embodiment contemplates a method for organizing agnostic sensor data at a master database, the method comprising: connecting the master database with a master communications device arrangement; at the master database, receiving a communications arrangement data packet containing arrangement indicia and arrangement attribute information; building a database definition for the master communications device arrangement in the master database based on the communications arrangement data packet, the database definition including the arrangement indicia, attribute definitions and a conversion algorithm associated with a component attached to a master communications device; receiving a data entry packet from the master communications device corresponding to a sensor value obtained by the component, the data entry packet including a dimensionless universal data value, a timestamp, and indicia related to the component; entering a record for the data entry packet in the master database according to the database definition for the master communications device; converting the first dimensionless universal data value essentially into the sensor value; tagging the sensor value with a dimension maintained by the database definition; and displaying a display version of the record that includes the sensor value with dimensions to an end-user.

Still some embodiments envision a computing device comprising: a microcontroller and a non-transitory memory; a plurality of sensor devices; a computing device definition comprising a plurality of sensor device each from a corresponding sensor device of the plurality of sensor devices, each of the sensor device definitions including a plurality of parameters describing the corresponding sensor devices and a sensor agnostic value conversion algorithm that is executable by the microprocessor to convert any corresponding sensor value obtained by the corresponding sensor devices to a dimensionless agnostic value consisting of one of a predefined range of numerical values; and a computing device data packet that includes the computer device definition and indicia from the computing device and the plurality of sensor devices.

Another embodiment contemplates a master communications device arrangement comprising: a master communications device that possesses a microprocessor and a non-transitory memory; a first external sensor component linked to the master communications device; an arrangement definition that is stored in the non-transient memory, the arrangement definition including a) a device definition of attributes corresponding to logical elements in or on the master communications device, and b) a component definition data packet of attributes corresponding to at least one sensor comprised by the first external sensor component and a first sensor agnostic value conversion algorithm corresponding to the first external sensor component, the algorithm executable by the microprocessor to convert any sensor value received from the first external sensor component to a dimensionless agnostic value consisting of one of a predefined range of numerical values; an arrangement data packet that includes the arrangement definition, at least one indicium corresponding to the master communications device, and at least one indicium corresponding to the first external sensor.

Another embodiment contemplates a master communications device comprising: a microprocessor connected to non-transitory memory which together comprise an agnostic value generator engine, a universal data transmission scheme 402 and 404, and a device arrangement data packet generator; a device data packet defined by a device definition and device indicia, the device data packet retained in the non-transitory memory, the device definition includes information about at least one on-board component, e.g., 208; means for connecting the master communications device to a centralized database; at least one component connector 210A configured to connect with an external smart sensor component, the external smart sensor component connected to the master communications device defines a master communications device arrangement, the agnostic value generator engine configured to convert a sensor value received from the smart sensor component into an agnostic value consisting of one of a predefined range of numerical values, the device arrangement data packet generator configured to generate a device arrangement data packet that comprises the device data packet including a sensor component definition data packet, the sensor component definition data packet includes a sensor component definition and at least one sensor component indicium, the sensor component definition data packet includes a conversion algorithm specific to the external smart sensor component that is arranged to be used by the agnostic value generator engine to convert the sensor value into the agnostic value.

While yet another embodiment contemplates a smart component device method comprising: providing a smart component devices that includes a sensor, a non-transitory memory, a component definition data packet retained in the non-transitory memory, and a microprocessor, the component definition data packet that includes component identification and a transformation algorithm; communicatively connecting the smart sensor devices with a master communications device; transferring the component definition data packet to a device non-transitory memory comprised by the master communications device; the sensor sensing a physical state; communicating a sensor value corresponding to the physical state to the master transmitter device in a form defined by at least one of sensor attribute; converting the sensor value to within a range of universal numerical values via the transformation algorithm.

Still another embodiment contemplates a component devices comprising: a sensor; a microprocessor; a component non-transitory memory; and a component definition data packet retained in the non-transitory memory, the component definition data packet includes component identification and a transformation algorithm adapted to convert any value sensed by the sensor to within a range of universal numerical values, the component devices configured to communicatively connect with a master communications device.

Yet another embodiment contemplates a method for acquiring sensor information, the method comprising: providing a master database that possesses a plurality of master attributes that differ from one another; providing a component possessing at least one sensor and component non-transient memory containing a component definition a component definition data packet including a component subset of the master attributes and a transformation algorithm adapted to convert any value sensed by the at least one sensor to within a range of universal numerical values; communicatively linking the component to a master communications device, the master communications device comprising a microprocessor, a transceiver, and device non-transient memory, the device non-transitory memory possessing a device definition defined by a device subset of the master attributes; transferring the component definition to the device non-transitory memory; transmitting the component definition data packet and the device definition to the master database; constructing a data acquisition receptacle for the master communications device and the component; sensing a sensor value at the sensor; transferring the sensor value to the master communications device; at the master communications device, transforming the sensor value to an agnostic value within the range of universal numerical values via the transformation algorithm; transmitting the agnostic value to the master database; at the master database, recovering the sensor value by applying the transformation algorithm in reverse on the agnostic value; and storing the recovered sensor value in the data acquisition receptacle.

Still yet other embodiment embodiments contemplate a method for acquiring sensor information, the method comprising: providing a master database; providing a component possessing at least one sensor and component non-transient memory containing a component definition data packet that includes a transformation algorithm adapted to convert any value sensed by the at least one sensor to within a range of universal numerical values; communicatively linking the component to a master communications device, the master communications device comprising a microprocessor and device non-transient memory, the device non-transitory memory possessing a device definition; transferring the component definition data packet to the device non-transitory memory; communicatively linking the master communications device with the master database; constructing a data acquisition receptacle for the master communications device and the component; sensing a sensor value via the sensor; transferring the sensor value to the master communications device; at the master communications device, transforming the sensor value to an agnostic value within the range of universal numerical values via the transformation algorithm; transmitting the agnostic value to the master database; at the master database, recovering the sensor value by applying the transformation algorithm in reverse on the agnostic value; and storing the recovered sensor value in the data acquisition receptacle.

BRIEF DESCRIPTION OF THE DRAWINGS

FIGS. 10A and 10B illustratively depict the construction of a device database table row embodiment in the master database consistent with embodiments of the present invention;

DETAILED DESCRIPTION

Initially, this disclosure is by way of example only, not by limitation. Thus, although the instrumentalities described herein are for the convenience of explanation, shown and described with respect to exemplary embodiments, it will be appreciated that the principles herein may be applied equally in other types of situations involving similar uses of the disclosed techniques to acquire sensor data and the like. In what follows, similar or identical structures may be identified using identical callouts.

Aspects of the present invention are generally related to providing agnostic sensor data (data that is not specific to any device) obtained from a sensor and sent to a central database in a manner that speeds up computing, improves data bandwidth and provides a way to produce and send sensor data that can be self-realizing at the point of destination. More specifically, a sensor component takes a measurement of something, next the value associated with that measurement is converted to an agnostic value defined as having a dimensionless universal scale and offset. The agnostic value is then sent to a data acquisition database where it is converted back to the original value (perhaps with lower resolution that is modified with fewer digits to the right of a decimal point to manage data size). This can be accomplished by the sensor itself providing its sensor definition to the data acquisition database. The sensor definition can comprise a scale and offset used to convert the sensor values in addition to any sensor indicia and/or other parameters used to display the data acquired at the data acquisition database. Certain embodiments envision the sensor being one of a number of components in a multi-sensor device arrangement configured to transmit and receive data from the data acquisition database, such as a server. The multi-sensor device arrangement connected to a plurality of sensors can send an overall definition of itself and the plurality of attached sensors to the data acquisition database. Accordingly, streamlined definition data that is essentially made up of dimensionless values, identifications and timestamps are sent to and from the multi-sensor device arrangement to streamline data transfer efficiency. Additionally, one or more new types of sensors can be auto-configured at the data acquisition database when their new definition data is sent from the connected multi-sensor device arrangement to the data acquisition database. User interface software can also be configured for each new type of data sensor to provide adequate interactive fields and displays for a user to manage or otherwise interact with the data produced by the new type/s of sensor data. Certain other embodiments envision sending dimensional data with sensor data produced by the multi-sensor device arrangement, which is less streamlined but may have other advantages.

Figure 1:
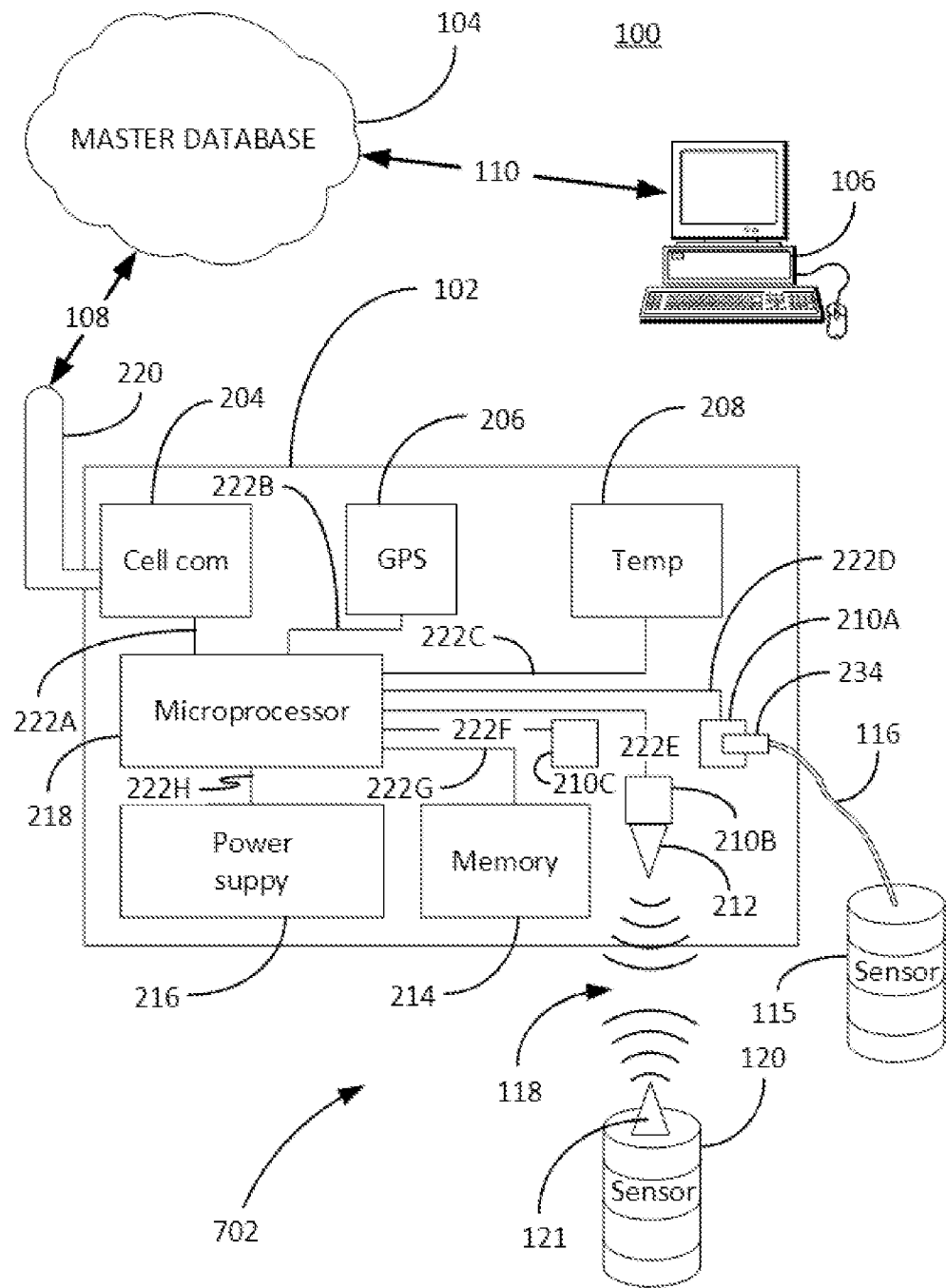
FIG. 1 depicts a block diagram of an agnostic data transmission environment in which certain elements of the present invention can adequately cooperate within the scope and spirit of the present invention.

FIG. 1 depicts a block diagram of an agnostic data transmission environment 100 in which certain elements of the present invention can adequately cooperate within the scope and spirit of the present invention. In the present embodiment, the agnostic data transmission environment 100 generally comprises a master communications device 102 that is communicatively linked 108 with a master database 104 and indirectly to an end-user 106 via the master database 104. The master database 104 being communicatively linked 110 with the end-user 106, and in certain embodiments the master database 104 interfaces with the end-user 106 that can change default options or alterable parameters that have been previously set (to some value/s) via End-User-Software, for example. The End-User-Software, in certain embodiments as the name implies, is envisioned to include software at the end-user 106. Local software, such as a proxy GUI (graphical user interface) software, mirrors the interface software version in the master database 104. It can be arranged to resemble certain management interface software programs that an end-user would be able to access essentially directly in the master database 104. More specifically, certain embodiments envision accessing and changing or otherwise manipulating sensor definition/s in the master database. This can be accomplished through user configurable fields via a software interface program that is essentially provided by the master database 104. Optionally, user configurable fields can be located at the end-user computer system/s 106, such as by way of a local software that, in some cases, mirrors the master database software.

The communicatively linked connections 108 and 110 can be a wireless, wireline, Internet, or other connection involving the appropriate hardware and software protocols known to those skilled in the art. The master communications device 102 is depicted communicatively connected or otherwise tethered to both a first external smart component 115 by way of a component wireline 116 and to a second external smart component 120 by way of a wireless connection 118 collectively comprising the multi-sensor device arrangement. As will be discussed later, a component as used herein is a physical electrical or electrical/mechanical device used in conjunction with a master communications device embodiment (such as device 102). The component can be internal or external to the master communications device 102. A component can be a sensor device/component with one or more sensors (transducers), an action producing device that causes one or more output actions (such as an audible alarm, for example), or some combination of a sensor (input) device and action producing (output) device.

The master communications device 102 generally comprises a plurality of onboard elements (such as elements either in or on the device 102) and tethered elements. Specific and dimensional data values obtained by those elements can be converted to dimensionless agnostic values that, in some embodiments, are within a predefined range of numerical values. The master communications device 102 is configured to at least a) transfer agnostic dimensionless numerical values from a sensor component to the master database, b) control activities of the components external or otherwise onboard the master communications device 102, and c) store and communicate master device parameters to the master database 104. As previously discussed, onboard components can be components in the master communications device 102 or on the outside of the master communications device 102, but are otherwise physically part of the master communications device 102.

The master communications device embodiment 102 generally comprises a microprocessor 218 that provides computing and controlling functions within the master communications device 102. That is, the microprocessor 218 is configured to manage communication between a component 115, a sensor transducer 208 (or other sensors and/or other components), memory 214, and all on goings to and from the master communications device 102 when communicatively connected with the server 104. Though not limited by the present configuration, a power supply 216 (such as a battery or power cord that taps into an electrical grid) provides power to the microprocessor 218 by an electrical trace 222H. In the present configuration, the microprocessor 218 is electrically connected (by way of electrical traces or wirelines) to the other electrical elements and components in, on or externally connected to the master communications device 102. Optionally, an external wireless component 120 is connected to the master communications device 102. The external wireless component 120 can be actively powered by battery or passively powered by harvesting electricity from the master communications device 102 wirelessly by way of induction through and electromagnetic field 118 possibly generated by the RF antenna 212.

The master communications device embodiment 102 further comprises device memory 214, an internal temperature sensor 208, a global positioning system (GPS) 206, a cellular communications device 204, and a plurality of external component connectors 210A, 210B and 210C. The device memory 214 can be a nonvolatile non-transient memory, such as one or more solid-state memory devices, or other non-transient memory devices that can be used to retain information without departing from the scope and spirit for of the present invention. The internal temperature sensor 208 (considered an onboard component) is electrically connected to the microprocessor 218 by way of electrical trace 222C. Certain embodiments envision the temperature sensor 208 being a thermocouple or some other kind of temperature sensor known to those skilled in the art. The GPS 206 can be an independent component attached to the microprocessor 218 by way of electrical trace 222B. Optionally, the GPS 206 can be integrated in another component or electrical element, such as the cellular communications chip/device 204. The cellular communications device 204 (or some other wireless communications device) can receive data that is intended for transmission to the master database 104 from the microprocessor 218, such as by way of electrical trace 222A. The cellular communications device 204 is connected to an antenna 220 that is configured to wirelessly connect 108 to a cellular tower transceiver (not shown) or some other Internet access hub, which serves as a gateway to the Internet and to the master database 104. Certain other embodiments envision the microprocessor connected to the master database 104 by way of an Internet wireline, such as an Ethernet cable for example. Yet other embodiments envision the microprocessor connecting to the database by way of a wireline or other wireless communication method. While still other embodiments envision using a "gateway" as a consolidator or repeater of a plurality of master communications devices 102 where data is received from one or multiple master communications devices 102 and then passed to the master database 104 using a wireless or wired connection. The master database can optionally reside inside a gateway. These embodiments are not intended to be limiting but rather are intended to provide a sense of the many other logical embodiments conceivable once grasped by a skilled reader.

In the present embodiment, three external component connectors 210A, 210B and 210C are arranged and configured to communicatively couple/connect with an external component to at least receive information from the external component, such as the first smart sensor component 115 connected to connector 210B. As shown, the first external component connector 210A is electrically coupled with the first smart sensor component 115 (through the wireline 116) via a wireline connector 234. A snap connector, a welded joint, a plug/socket connector, or some other connector known to those skilled in the art can form the coupling relationship between the external component connector 210A and the wireline connector 234, for example. Once connected, the first smart sensor component 115 is electrically and communicatively linked to the microprocessor 218 via electrical trace 222D. Similarly, the second external component connector 210B is wirelessly connected to the second sensor 120 by way of a wireless communication connection 118, such as through RF. As shown, the second external component connector 210B possesses an antenna 212 that facilitates communication with the second external component 120. Optional embodiments envision wireless communication to include infrared, sound, visible light pulses, or some other kind of wireless communication known to those skilled in the art. Once connected, the second external smart sensor component 120 is communicatively linked to the microprocessor 218 via electrical trace 222E.

The third external component connector 210C possesses an electrical trace 222F to the microprocessor 218 and is available to be connected to a future external component thereby providing an expandable arrangement. It should be appreciated that additional external component connectors can be incorporated for greater expansion within the scope and spirit of the present invention. Here, the first smart sensor component 115, the second smart sensor component 120 and the master communications device 102 collectively make up a master communications arrangement 702.

Some embodiments consider the master communications device 102 more simply being viewed as a computing device that generally comprises the microcontroller 218 and the memory device 214 (which can essentially be a single compact device or chip set). The simple computing device, collectively 218 and 214, can therefore be connected with a plurality of sensor devices and component devices 206, 216, 115, 208 and 120. From this perspective, it is irrelevant if there are external or onboard components or sensors. Accordingly, all sensor readings and component definitions can be transferred to the memory along with each corresponding agnostic data value conversion algorithm (such as a computer software) whereby the computing device 214 and 218 can communicate and transmit the agnostic data values obtained from the sensors and components to the master database 104.

Figure 2A:
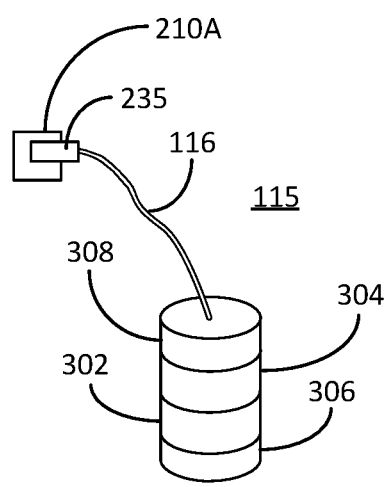
FIGS. 2A-2D illustratively depict block line drawings of the external components consistent with embodiments of the present invention.

FIGS. 2A-2D illustratively depict block line drawings of the external component embodiments in greater detail consistent with embodiments of the present invention. With reference to FIG. 2A, the first external component 115, which is a tethered smart sensor, comprises a sensor transducer 306, nonvolatile/non-transient solid-state memory (component memory) 302, a component microcontroller/microprocessor 304, and a wireline interface 308 that physically connects the wireline 116 to the first smart sensor component 115. The microprocessor 304 is configured to manage communication between the sensor transducer 306, the component memory 302, and the connected master communications device 102. The sensor transducer 306 is a hardware device/transducer that senses a physical change of an object or environment (or whatever the sensor transducer 306 is intended to sense) when exposed thereto. For example, if the sensor transducer 306 is a temperature sensor, it will sense the temperature of an object that it is attached to or to environment in which it is exposed. If, for example, the sensor transducer 306 is a gravity sensor, it will sense the gravity of an object or the environment in which it is exposed. If, for example, the sensor transducer 306 is a light sensor, it will sense light received either diffusely or in a line of sight, etc. The component microprocessor 304 provides the computing and logic functionalities to condition transducer information/values from analog to digital data if desired and to move those values to the master communications device 102 or to the component memory 302. The component microprocessor 304 is also envisioned to perform other computing functions as needed for the first external component 115 to operate as desired.

The component memory 302 can initially come with a preloaded data packet that includes information on how values received from the first smart sensor component 115 are to be recorded. The first smart sensor component 115 may come with multiple sensors and may further include multiple output action components, such as lights or sound producing elements for example. The data packet can originate (be preloaded or otherwise originally stored) with an original equipment manufacturer (OEM) or from some other entity prior to connecting the first external smart sensor component 115 to the master communications device 102. Fundamentally, certain embodiments envision a component data packet 350, shown in FIG. 3, comprising: 1) some sort of unique identifier (indicium or indicia) 352 corresponding directly to the component as well as any sub-components or sensors comprised by the component; 2) reading value definitions/instructions (for example, a transformation algorithm) 354 on how to convert values coming from the one or more sensors in the component to a common/universal value increment and range (a dimensionless numerical value that is within a predetermined and accepted universal range of numerical values, such as between −10 and +10); and 3) default configurable instructions (default options) 356 for data collection rates, limits, alerts, etc. that can later be changed. For purposes of explanation and by way of example, the first smart sensor component 115 of FIG. 2A may be used throughout the description as a generic sensor component 115 and, hence, could be used interchangeably with components 120, 330 and 340, for example. Additionally, the associated elements 302, 304, 306, etc. comprised by the sensor component 115 may generically be used by way of example throughout the present description. Accordingly, it should be appreciated that a description involving the sensor transducer 306 may be broadly applied to sensor transducers X 318, Y 316 and Z 314 without departing from the scope and spirit of the present invention.

Figure 3:
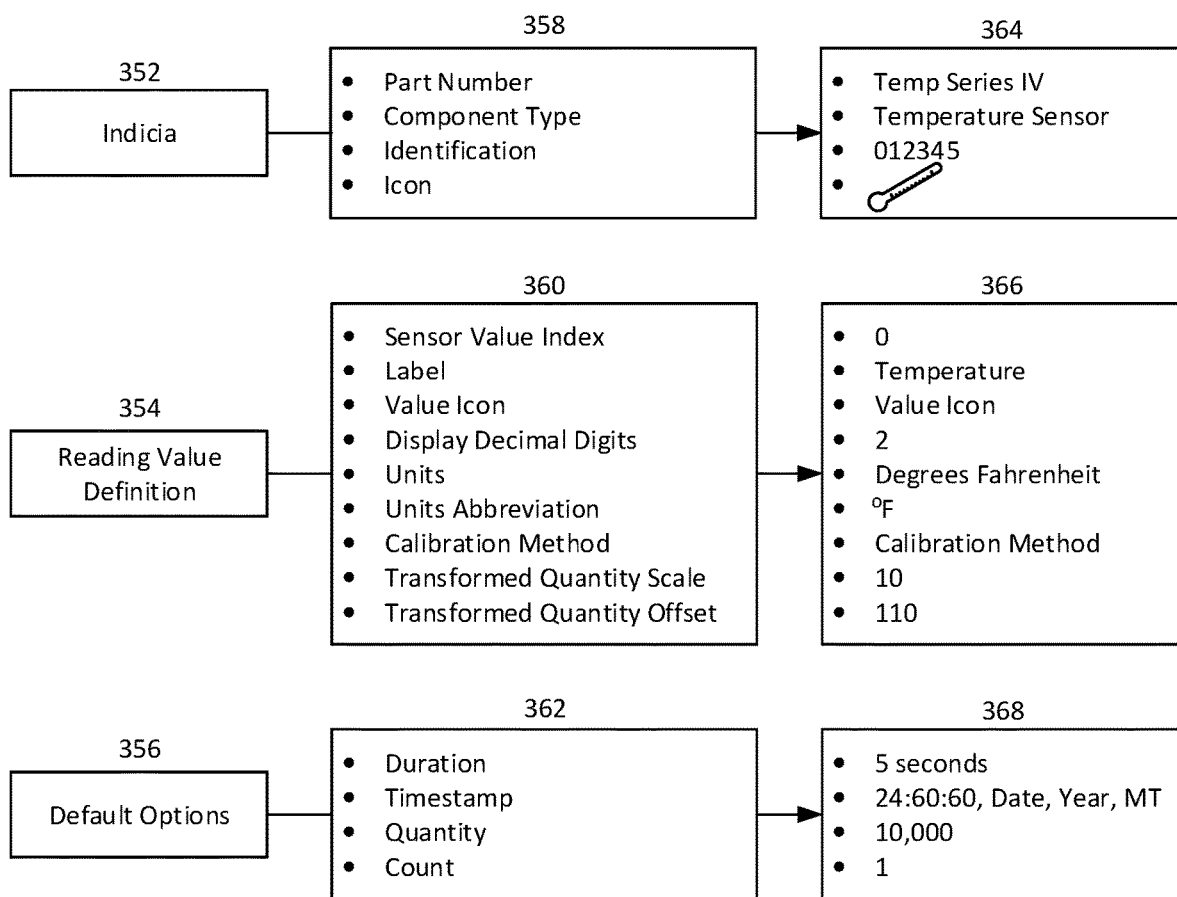
FIG. 3 illustratively depicts a block diagram of a data packet definition for a sensor or subcomponent in a component device consistent with embodiments of the present invention.

As shown in the block diagram of FIG. 3, certain embodiments envision the originating component data packet 350 for a particular component including three data packet categories of information for each sensor or subcomponent comprised by the component: 1) component indicia 352, 2) sensor reading value definition 354, and 3) configurable default options 356. It should be appreciated that this embodiment is a simplified structure that can include additional categories, different categories, etc., depending on what ultimately makes sense for an end user. Configurable default options 356 are the originally set option values, parameters, layouts, limits, etc. (e.g., factory settings) that can be later reconfigured or changed by an end-user 106. In some instances, the default options 356 are envisioned as being originally uploaded into the master database 104 and then once in the master database 104, the default option 356 can be changed by an end-user 106 to meet their specific needs. The default options 356 provide a fallback set of options for particular sensor in the event the end user 106 does not reconfigure or alter any of the settings associated with the default options 356 sometime later.

The block diagram of the originating component data packet embodiment 350 of FIG. 3 is arranged showing the designated data packet category block to the left with a middle block showing some of the defining elements of the designated data packet category and a far right block depicting an example of the defining elements. The component indicia category block 352 is envisioned as providing a unique identifier for specific component, that in certain embodiments includes all of the unique identifiers for each sensor or subcomponent comprised by the specific component. The middle block 358 shows a plurality of possible indicia parameters in a field that are bulletized. Examples of component indicia parameters 358 can include a component part number, component type, identification number and an icon. The far right block 364 illustratively depicts an example of the defining elements corresponding to the middle block 358. For example, the part number in the middle block 358 is known as a Temp Series IV which corresponds in the right block 364, the Component Type is a Temperature Sensor, Identification is 012345, and the Icon is a thermometer visually aiding what the component is. If the component has multiple sensors or subcomponents, certain embodiments envision unique indicia for each sensor or subcomponent. In other words, if there were two different kinds of sensors and one subcomponent comprised by a particular component, there would be three different fields like field 364 that would have three different indexes for the particular component.

The sensor reading value definition category block 354 is and embodiment envisioned to provide instructions on how to convert values (or readings) coming from the sensor. This can be the instructions on how to convert each value coming from the sensor to a universal dimensionless value and range that can be efficiently sent and potentially stored to a database as simple universal numbers that do not rely on any particular type of sensor, i.e., the numbers are agnostic. To this end, certain embodiments contemplate a non-limiting list of sensor value parameters bulletized in the middle block 360. Examples of sensor reading value parameters can include a Sensor Value Index, Label, Value Icon, Display Decimal Digits, Units, Units Abbreviation, Sensor Calibration Method, Transformed Quantity Scale, Transformed Quantity Offset, etc. The far right block 366 illustratively depicts an example of the defining elements corresponding to the middle block 360. For example: a) the Sensor Value is indexed as 0 (if there was a second sensor in the component the second value would be 1, and so on), b) Label is Temperature, c) Value is Icon, d) Display Decimal Digits is set at 2 which corresponds to 2 decimal places (i.e., 0.00), e) Units are set to degrees Fahrenheit, f) Units Abbreviation is set to ° F., g) Calibration Method is envision to be a routine that would be effective for whatever the specific sensor is, h) Transformed Quantity Scale is set at 10 (which means that every numerical value sent from the sensor to the master communications device 102 is first multiplied by 10 and that transformed value when received at the master database 104 from the master communications device 102 is divided by 10), i) Transformed Quantity Offset is set at 110 (which means that every numerical value sent from the sensor to the master communications device 102 is increased by adding 110 and that transformed value when received at the master database 104 is decreased by subtracting 110). There could be a sensor value definition field for each sensor or subcomponent comprised by the component. Certain other embodiments envision component data packet 350 further including parameters, name and/or part number of the component, configurable component parameters, and reading values provided by the sensor, to name a few. Configurable component parameters could optionally replace the default options 356 including parameter display names, parameter value types, parameter default types, and parameter constraints. It is further contemplated that reading value definitions 354 can include at least one of a value display name, value unit, value icon, value display format, value calibration method, and at least one (and in some embodiments, up to two) value transformation parameter.

With continued reference to the reading value definition 354, certain embodiments envision the instructions, exemplified in the middle block 360, being carried out by a transformation algorithm existing in the master communications device 102. In this embodiment, the component data packet 350 need only provide a definition for transformed quantity scale and transformed quantity offset to the master communication device 102 measurement values obtained by the sensor component to be converted within the pre-established range of universal numerical values. Accordingly, the transformed quantity offset and scale "essentially"

convert numbers between dimensionless universal numbers and values sensed by the sensor (back-and-forth), for example. The term "essentially" may be used herein because a sensor value obtained from a sensor may actually possess fifty decimal places to the right of the decimal point and yet the conversions may only account for four decimal places to the right of the decimal point. Nonetheless, the value is essentially the same and only differs as a matter of precision. With that certain embodiments envision an algorithm that is either fixed or user alterable to set the number of decimal places. Without departing from this concept, other embodiments envision the transformation algorithm existing in a definition within the components data packet 350 that is sent along with or as part of the data packet 350 during the initialization of the sensor.

With reference to field 362, the end-user default options category 356 is envisioned to define what user-configurable options will be available to the end-user in the end-user software, provide default instructions for on how to collect data values from the sensor in addition to certain actions related to the data values collected from the sensor. Certain embodiments envision default options displayed in the default options field 362 including duration, timestamp, quantity, and count. In one particular example, the default options field 368 shows that:

The end-user default options category block 356 is an embodiment envisioned to define what user-configurable options will be available to the end-user in the end-user software and to provide default instructions for how to collect data values from the sensor. Additionally, certain output actions related to the data values collected from the sensor can be provided, such as sound, light, vibration, etc. The middle block 362 lists a plurality of non-limiting default options including duration, timestamp, quantity, and count. The far right block 368 illustratively depicts an example of the defining elements corresponding to the middle block 362. For example: a) the Duration is set to collecting a data point every five seconds, b) Timestamp is set at hour of the day (on the 24-hour scale), minute, second, date, year, Mountain time, c) Quantity is set to 10,000 measurements, and d) Count in increments of 1. The default options can be later changed (adjustable) by an end-user 106, such as by interfacing with the master database 104, for example. The default options 356 can correspond to a subset of predefined master sensor adjustable options (not shown) that can be located in the master database 104 (such as if the master database 104 is preloaded with a master list of predefined options that are configurable). As with the other fields 364 and 366, if the component has multiple sensors or subcomponents, certain embodiments envision that there would be an options field for each sensor or subcomponent comprised by the component.

Figure 2B:
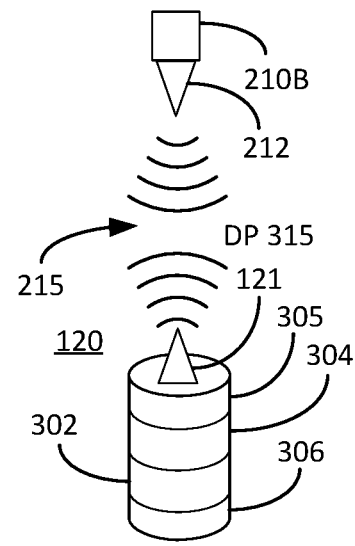

With continued reference to FIGS. 2A-2D, the wireless component 120 of FIG. 2B possesses some of the same elements (302, 304, 306) as the tethered component 115 with the exception that it has a transceiver 121 configured to wirelessly communicate with the master communications device 102 and an independent power supply 305, such as a battery for example. As depicted, the wireless component 120 wirelessly transmits 215 its component data packet (DP) 315 to the master communications device 102 via the RF (radiofrequency) antenna 212 located at the external component connector 210B. Certain embodiments envision the wireless component 120 being a passive component harvesting power from the RF field 215 instead of using a battery. Other embodiments envision the wireless component 120 communicating by way of infrared light, light spectrum pulses, ultrasound or other wireless techniques known to those skilled in the art.

Figure 2C:
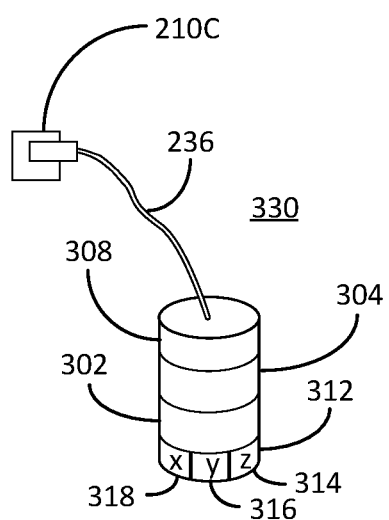

FIG. 2C is a block diagram of a vibration sensor component that has three sensors: an x-directional sensor 318, a y-directional sensor 316, and a z-directional sensor 314. In this configuration, the xyz component data packet will have three different component indicia fields 358, three different sensor value definition fields 360 and three different default option value fields 362. That is, one set of categories for each directional sensor.

Figure 2D:
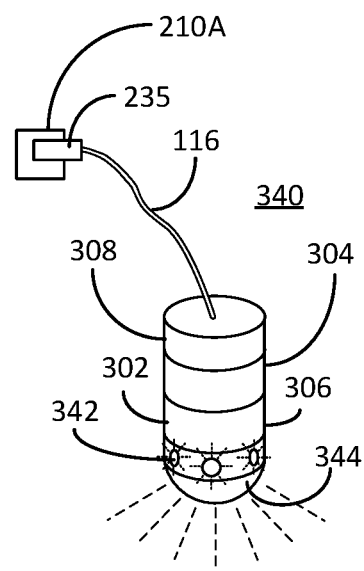

FIG. 2D is a block diagram of a wireline component 340 possessing a plurality of output action subcomponents, i.e., sound producing subcomponents 342 and a light subcomponent 344. This component 340 may or may not have any sensors associated therewith. Certain embodiments envision the component 340 comprising a specific light-sound component data packet with a set of component definition fields (e.g., fields 352, 354 and 356) for each subcomponent 342 and 344. Moreover, the component light-sound data packet may be arranged differently with different parameters (reflecting action related values instead of data generating values) specific to the subcomponents from those described with the sensor transducer 306. Certain embodiments envision action related values may be transformed with quantity scale and offset in a reverse manner as with a sensor 306. In other words, commands may be sent from the master database 104 in universal transformed values (such as, numerical values between −10 and +10) that are directed to a particular action component and subcomponent. The universal transformed values are then reversed at the master communications device 102 whereby the action component, such as a light or speaker, responds to the reverse transformed (output) value. Certain embodiments envision sensors, or more particularly the sensor transducers, being included from a group of sensors comprising a temperature sensor, and acceleration sensor, a strain sensor, a Hall effect sensor, a back EMF sensor, a pressure sensor, sounds sensor, light sensor, and a location sensor.

Some configurations incorporate dumb components with the master communications device 102 without departing from the general principles of an associated data packet. A dumb component does not contain memory, a microprocessor, and other electronics that generally comprise a smart sensor. Dumb components are typical generic 'off-the-shelf' components, such as a dumb thermocouple that simply produces an output voltage corresponding to a change in temperature. When a dumb component is attached to the master communications device 102, a data packet 350 can be loaded to the master communications device 102 either directly (such as by a USB interface) or by way of a remote connection, such as through the master database 104, to name several examples. In this way, each attached component will roll up into an overall master communications arrangement definition 400, of FIG. 4.

For purposes of example, this paragraph explores an embodiment of a dumb thermocouple component (an example of a dumb component) attached to a master communications device 102 with the dumb component definition 350 separately loaded to the master communications device 102. Each thermocouple typically comes with a specification sheet (spec sheet) that provides an output voltage range (typically in the mV range) corresponding to a temperature range, the type of thermocouple, settle time (e.g., take data after 20 seconds), etc. In some cases, the thermocouple output voltage will have a standard voltage range and offset relative to a particular temperature range. For example, 0 mV=0° F. and 100 mV=100° F. In this case, part of the component definition can include a mathematical algorithm that relates thermocouple output voltage to a temperature value. In other cases, each thermocouple will have a slightly different voltage range with corresponding temperatures. For example, thermocouple #1 has a calibration of 1.37 mV=0° F. and 97.21 mV=100° F., and thermocouple #2 as a calibration of 1.99 mV=0° F. and 98.74 mV=100° F. In this case, certain embodiments imagine an additional options configuration field/s being included in the component definition that permits manual input of the individual component calibration values, which can be used in a mathematical algorithm to convert voltage to ° F. Other embodiments further imagine options included in the component definition to allow the end user 106 to adjust or enter in the mathematical conversion algorithm.

Figure 4:
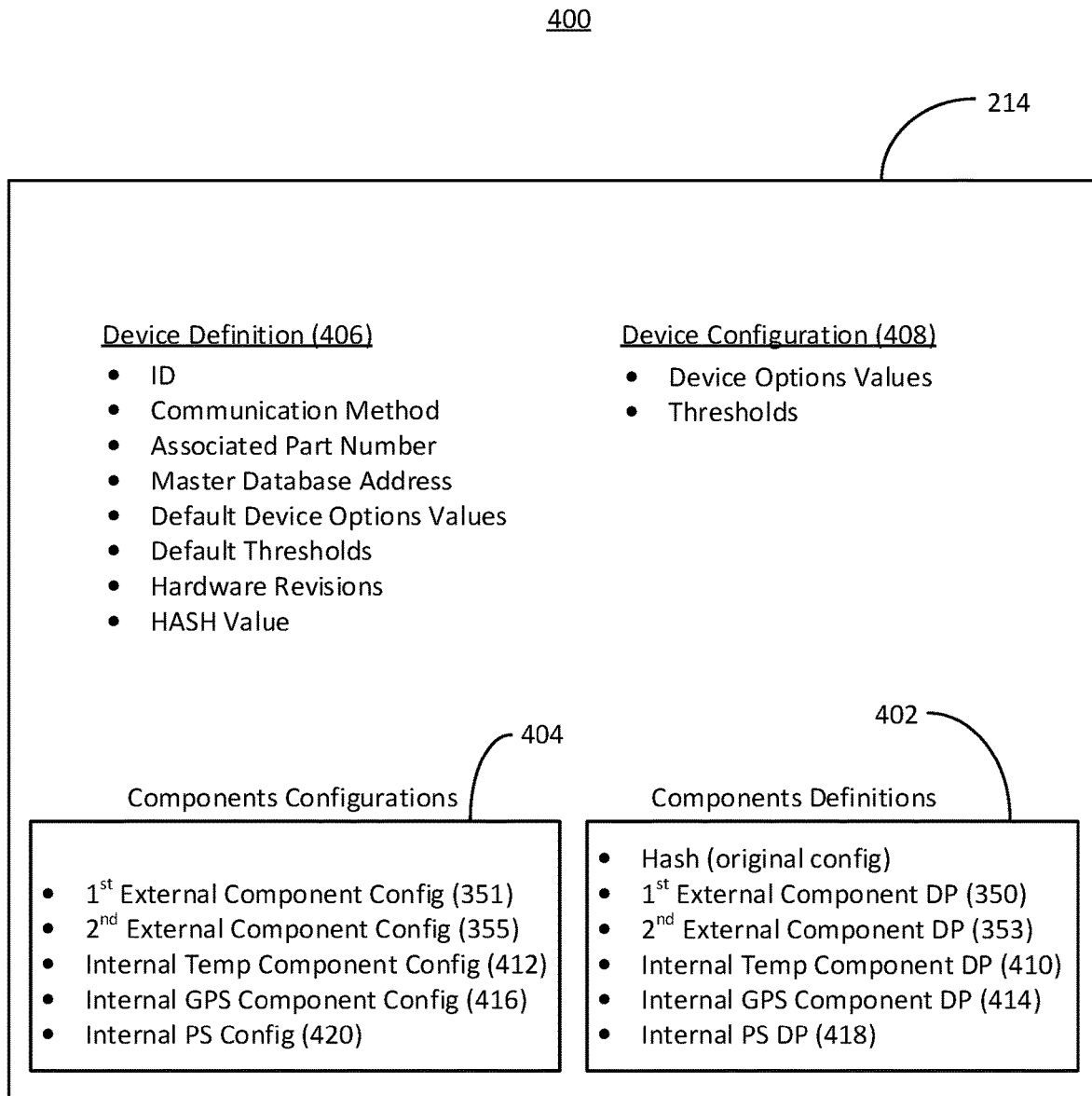
FIG. 4 illustratively depicts a device data packet consistent with embodiments of the present invention.

FIG. 4 illustratively depicts a device data packet consistent with embodiments of the present invention. With reference back to the master communications device 102 of FIG. 1, the device memory 214 is configured to contain (retained in storage) a device data packet comprising at least definitions and configurations that can be used to setup all of the necessary data acquisition and control structures of the master communications device 102 at the master database 104. In the present embodiment, the device data packet 400 generally comprises Components Definitions 402, Components Configurations 404, Device Definition 406 and Device Configuration 408. An embodiment of the Components Definitions (block) 402 represents a first logical bin (or folder) that can contain each attached data packet 350 and 353 from the external components 115 and 120 as well as the internal device components data packets 410, 414 and 418 from the master communications device 102. More specifically, the Components Definitions (block) 402 contains the first external component data packet 350 described in FIG. 3, the second external component data packet 353, an internal temperature sensor data packet 410 associated with the internal temperature component 208, internal GPS component data packet 414 associated/corresponding with the GPS 206, and an internal power supply data packet 418 associated with the power supply 216. The Components Configurations embodiment (block) 404 represents a second logical bin (or folder) that provides optional configurations for each component that is either externally attached (element 115 and 120) or internal to the master communications device 102 (elements 208, 206 and 216). The Components Configurations 404 allows for alterable values/adjustments by an end-user 106 thereby overriding or otherwise changing the default values originally provided by the components when setting up an associated record in the database 104.

Along with the Components Configurations 404 and the Components Definitions 402, stored to the device memory 214 are also a Device Definition 406 and a Device Configuration 408. As listed, the Device Definition 406 can include: a) a device identification, method of communication, b) an associated part number, c) an address or pointer (such as an Internet address) to connect to the master database 104, d) default device value options that can be changed by an end-user 106 later on, e) default thresholds (which can also be changed by an end-user 106 later on), f) any hardware or software revisions, etc. The Device Configuration 408 includes values or instructions that can be tailored by an end-user 106 that are either added to the device configuration or override default values that come with the master communications device 102 when first connected to the master database 104.

Figure 5:
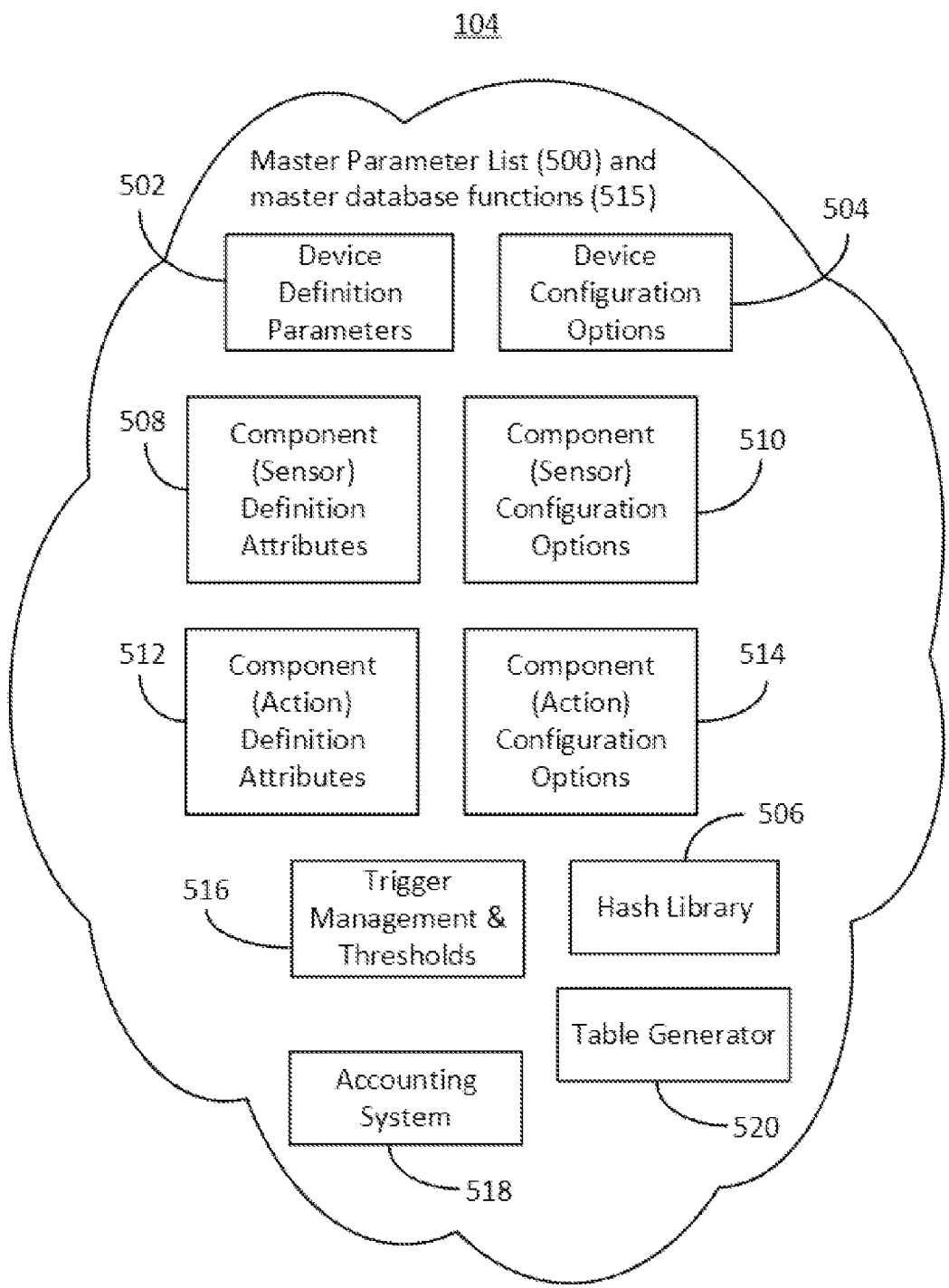
FIG. 5 illustratively depicts a block diagram of a master database master parameter list and master database functions embodiment consistent with embodiments of the present invention.

FIG. 5 is a block diagram of a master database master parameter list and master database functions embodiment consistent with embodiments of the present invention. Though illustratively shown as a cloud based server (the server possessing computing processors, mass non-transient storage, switches and routers, and the other elements that comprise a server well known to those skilled in the art), the master database 104 is not limited to this arrangement and could be a private server, a server on a single board computer inside part of the system, or some other data acquisition computing system with memory. The master database 104 digitally contains an expandable master parameter list 500 that can be used (at least) in defining a component or transmitter device. The expandable master parameter list 500 of available device definition parameters 502, device configuration options 504, components definition attributes 508 and 512, component configuration options 510 and 514, and end-user thresholds 516 component definition attributes 512. The master database 104 can further include unique identifiers, such as serial numbers for example. In certain embodiments, the expandable master list 500 can be dynamically updated as needed when the database 104 receives new definition information provided by newly attached devices (each sensor 306 or component 115 carries device definition parameters 502 that may include new information that can be used to update the master list 500). If a potential parameter, option or attribute is not in the master parameter list 500, then the potential parameter is unavailable for use in a device definition 406 or component definition 402. Certain embodiments envision the master parameter list 500 being predefined relative to the devices (such as device 102) and components (such as component 115) that are defined by a subset of the master list 500. A subset of the master list 500 is selected when setting up the definitions for elements connected to the master database 104. For example, the master communications device 102, action producing components 340, an internal component 208 or 216, a smart sensor component 115, or other elements sending data or receiving actionable instructions/commands by the master database 104 are defined by a subset of the master list 500.

As previously discussed in conjunction with FIG. 4, certain embodiments envision the device definition parameters 502 being essentially a complete list of the likely if not essentially all of the possible master device parameters and device configuration options from which a subset is used to define the master communications device 102. Some other device definition parameters 502 can include display name, read access, read/write access, default values, and option constraints, just to name a few examples. Certain other device configuration options 504 can include storage mode, device mode, transmission intervals and triggers that may change the transmission intervals, sensor sampling triggers, communication option values, trigger intervals and conditions, data schedules, offset begin and end ranges, threshold conditions, etc.

As previously discussed in FIGS. 3 and 4, certain embodiments contemplate the component definition (sensor) attributes 508 and (action) attributes 512 being essentially a complete list of all of the known possible master component attributes of which a subset of those component attributes are selected to define a component of interest (such as component 115). Likewise, certain embodiments contemplate sensor component configuration options 510 and action component configuration options 514 as being essentially a complete list of all known possible master component configuration options of which is a subset is selected to configure a component of interest (such as components 115 and component 340, for example). In other embodiments, the master parameter list 500 is a complete predefined list of available a) attributes 508 and 512, and b) options 510 and 514 believed relevant and universal to all components.

Accordingly, a subset or subgroup (that is less than all) of the parameters for the master list 500 can be selected and stored into the respective memory of a new component (potentially comprising sensor/s and subcomponents) or optionally to the memory of a new master transmitting device. In this way, the subset of parameters chosen when defining and putting together a data packet for a new component or new master transmitting device (such as by an OEM) will be compatible with and understood by the master database 104.

Certain other embodiments envision parameters originating from a component or a master communications device (i.e., not seen before in the master database 104), and adding those new parameters to the master parameter list 500 in the master database 104 (in the appropriate places). For example, some sort of new antigravity device could provide new antigravity symbols, antigravity icons, antigravity units, antigravity unit abbreviations, antigravity calibration method, etc. In this way, the master parameter list 500 may (or may not be consulted) when building a new component or device at an OEM. This also provides a pathway to expand a pre-existing device arrangement with additional components by plugging them in. Moreover, an end-user 106 can customize a pre-existing component 115 with specific custom parameters and have that customized pre-existing component listed or otherwise entered in the master parameter list 500. It is envisioned that in some cases an end-user 106 may find that an off-the-shelf sensor is not "just right" requiring certain custom adjustments or tweaks.

Other elements of FIG. 5 include the master database functions 515, which can comprise a trigger management and thresholds block 516, a hash library 506, an accounting system 518, and a table generator 520. Though triggers and limits are likely best kept in the master list 500, certain embodiments contemplate the trigger management 516 for a given device arrangement being maintained by the master communications device 102 for a specific device arrangement, such as 702. Trigger management 516 can be responsible for executing specific triggers in a specific way and alerting an end-user 106 or some other entity if some threshold is met or exceeded. The accounting system 518 is envisioned to keep track of where all the data generating elements, end-users, parameters, and other data structures and data elements are maintained in the master database 104. The hash library 506 and the table generator 520 are discussed in more detail below in conjunction with the methods of FIGS. 6A-6B.

Figure 6A:
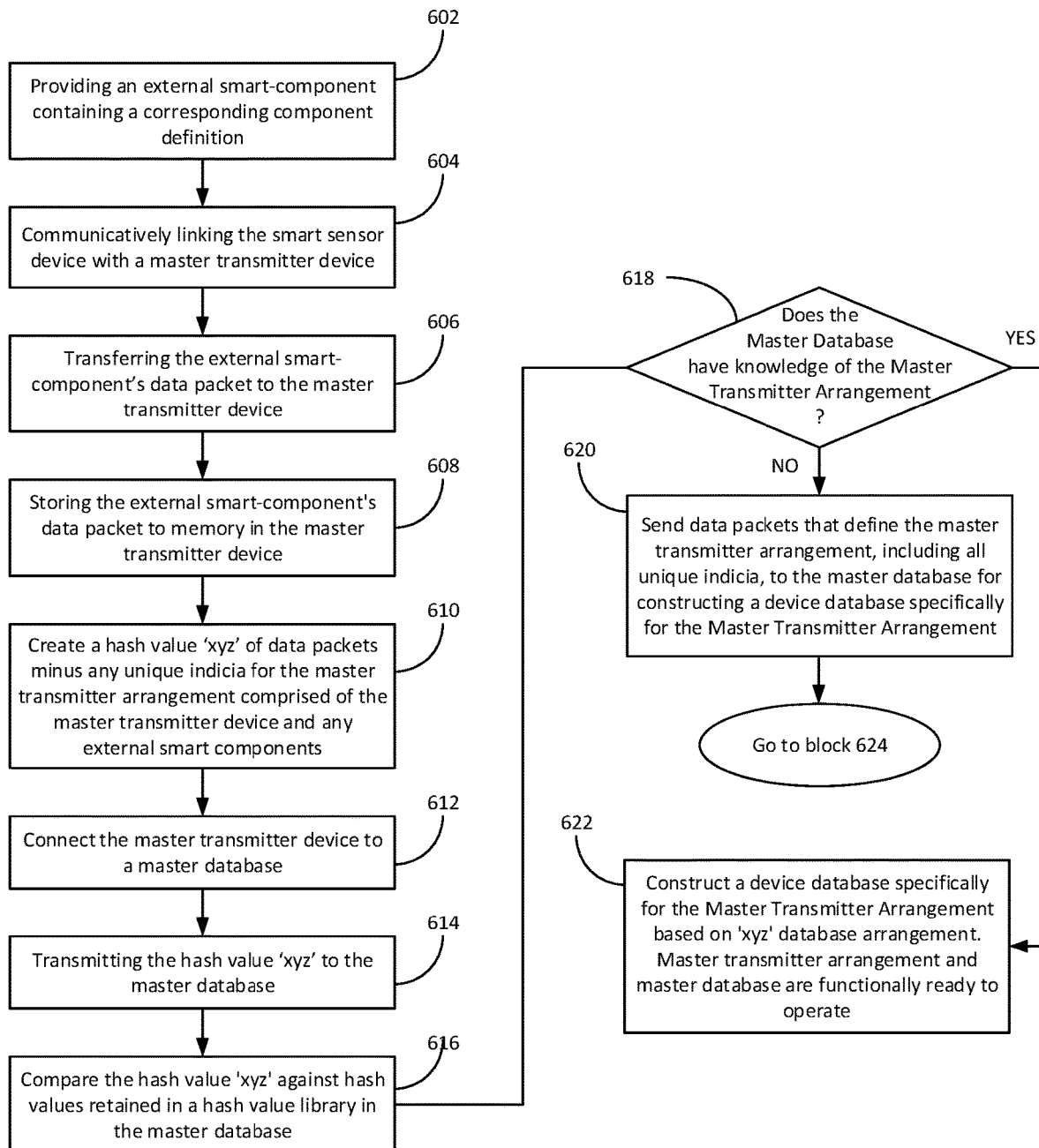
FIGS. 6A-6B are block diagrams that exemplify certain method embodiments for accessing and using an agnostic data transmission environment consistent with embodiments of the present invention.
Figure 6B:
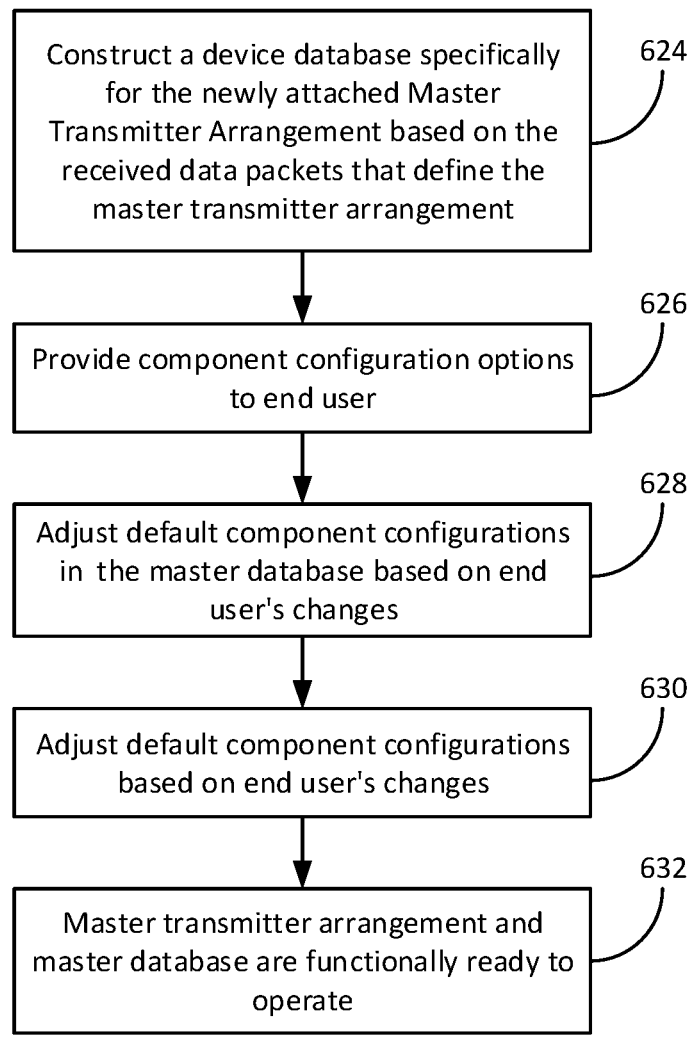

FIGS. 6A-6B are block diagrams exemplifying certain method embodiments for accessing and using an agnostic data transmission environment 100 consistent with embodiments of the present invention. With reference to FIG. 6A (in view of FIGS. 1, 3 and 7A-7C), starting at step 602, a first external smart component 115, or simply "first component", (embodying the described features of the present embodiment), is attached to the master communications device 102 through external component connector 210A, step 604. The first component 115 can be attached at an OEM, on-site by an operator or elsewhere. In step 606, once the first component 115 is attached to and powered by the master communications device 102, the corresponding first component data packet 350 is transferred to the master communications device 102. More specifically, the data packet 350 from the first component 115 is transferred to the device memory 214 via wireline 116. It is understood that the master communications device 102 is powered on in order to provide power to the first component 115. As previously discussed and by way of example, the component data packet 350 sent by the first component 115 includes the indicia information 364, the reading value definition 366, and the default options 368. It should be appreciated that other component definition parameters can be included in addition to or less than these data packet 350 elements without departing from the scope and spirit of the present invention. Here, the nuts and bolts of a conversion algorithm (or some kind of agnostic value generator engine) exists in the master communications device 102. It is configured and arranged to perform external sensor value conversion operations that are tailored for the incoming values obtained by the sensor component 115. The sensor value conversion operations transform quantity scale and offset from as received input values to the universal agnostic value numbers previously discussed. In other words, the corresponding transformed quantity scale and offset provided by the sensor component 115 are required to initially configure the conversion algorithm (agnostic value generator engine) to essentially convert incoming sensor values for sensor component 115 to non-dimensional agnostic values within the standard universal range of numerical values inputted to the master database 104.

Next in block step 608, once the data packet 350 is transferred to the master communications device 102, the first external component data packet 350 is stored in the device memory 214. The same steps can be done when adding a second external smart component 120 (the second external smart component 120 embodying the associated described features of component 120). When the first smart sensor component 115 and the second smart sensor component 120 are attached to the master communications device 102 and their respective data packet definitions are stored in the master communications device 102, the overall master communications arrangement 702 is essentially defined and by way of example is shown in FIG. 7. As provided by step 610, once the master communications arrangement 702 is defined, a hash value can be generated for all of the definitions in the master communications arrangement 702 minus any unique indicia. For purposes of simplicity, let the hash value for the master communications arrangement 702 be 'xyz'. Certain embodiments envision the hash value 'xyz' being retained in the device memory 214. The hash value can be generated by the microprocessor 218, for example.

Certain embodiments envision the master communications device 102 being connected to the master database 104 following step 610 while other embodiments envision the preceding steps not required to follow the order as presented. Either way, in step 612 the master communications device 102 is connected to the master database 104 by way of an IP address, or some other target address, obtained by the master communications device 102, which in some embodiments is simply stored in the device memory 214. As provided in step 114, once connected or otherwise communicatively linked, the master communications device 102 transmits the hash value 'xyz' to the master database 104. In step 116, the hash value 'xyz' is compared to a hash library 506 retained in the master database 104 to see if there is a match. If there is a match to the hash value 'xyz' in the master database 104 proceed to step 622, otherwise proceed to step 620, see decision block 618. More specifically, if "YES" proceed to step 622, which is a step for constructing a device database (data repository) that is specifically for the master communications arrangement 702 based on a previously constructed arrangement associated with the hash value 'xyz' already in the master database 104. The master transmitter arrangement 702 and the master database 104 are functionally ready to start working together. If "NO", proceed to step 620 and commence sending the master communications arrangement definitions 400, including all unique indicia, to the master database 104. Once in possession of the master communications arrangement definitions 400, the master database 104 will construct a specific and unique device database for the master transmission arrangement 702 at step 624 shown in FIG. 6B.

In an optional embodiment, there can be shared resources and tables for multiple transmission arrangements (702, 704, 706, etc.) instead of a specific and unique device database for only the master transmission arrangement 702. Accordingly, a database definition that is unique to the master transmission arrangement 702 can point to records acquired in a common (shared) database. The common database serving a plurality of master communications arrangements. In this particular embodiment, the database definition for the master transmission arrangement 702 does not point to records corresponding or otherwise associated with other master transmission arrangements. Certain embodiments envision the specific and unique device database being a logical storage volume, such as a folder in a file system or other data receptacle that is dedicated to only the corresponding device/arrangement and not to any other devices or arrangements. The logical storage volume can contain the specific attributes and options for a particular master communications device while sharing a data acquisition table with a plurality of other device databases (receptacles). In this embodiment, the data acquisition table can be constructed with input values obtained from components in each corresponding arrangement. As such, a different row in the common table can correspond with a different component or subcomponent. Each device database can possess pointers that point to their corresponding data in the common data acquisition table.

Regardless of how the database is set up, maintaining a hash library 506 minimizes data transfer from the master communications device 102 thereby preserving battery life and bandwidth consumption of the master communications device 102. More specifically, transmitting the hash value 'xyz' specific to the master communications arrangement definitions 400 (minus any unique indicia) dramatically accelerates the addition of new sensor types by eliminating the expensive and time-consuming need to update the database and user software for a new unique master communications devices 102. If there is a match with hash value 'xyz' in the hash library 506, the complete device definitions data packet 400 does not have to be sent because the master database 104 already has the information it needs to set up a designated device database for the master communications device 102. Moreover, if there is a hash match, the database is already set up for the same designated device, and no further action of setting up the database is required beyond creating records for the particular transmitting device. If there is not hash match, then the complete definition is requested, transferred and set up in the database. This is particularly beneficial if there are a lot of arrangements identical to the master transmission arrangements 702 that were previously deployed. An example is when a common model of a particular arrangement is frequently bought and used.

Figure 7A:
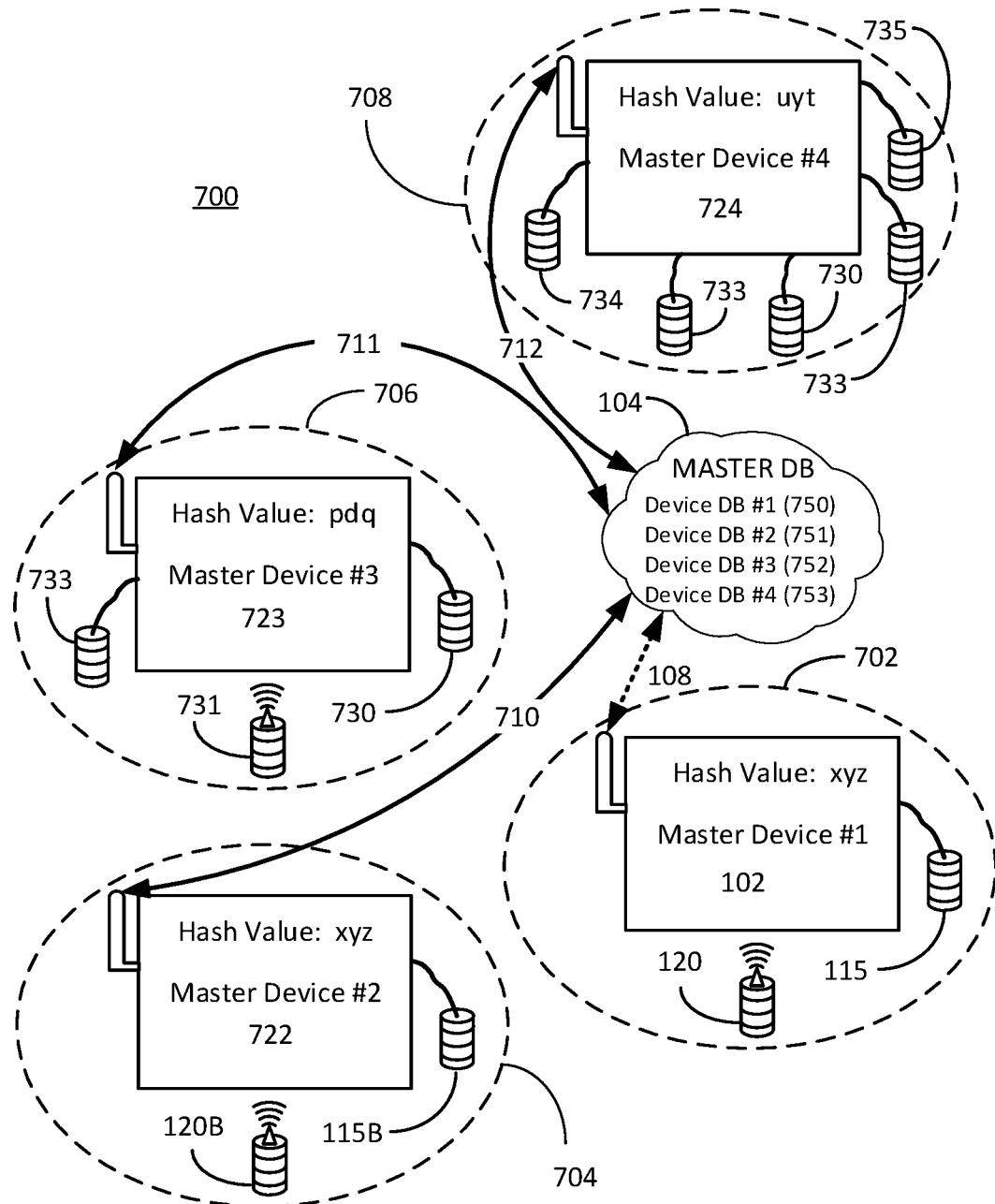
FIGS. 7A-7C are line drawings that exemplify a master database communicatively linked with a plurality of master communications arrangements and in conjunction with a hash library that is used in setting up specific device databases consistent with embodiments of the present invention.
Figure 7B:
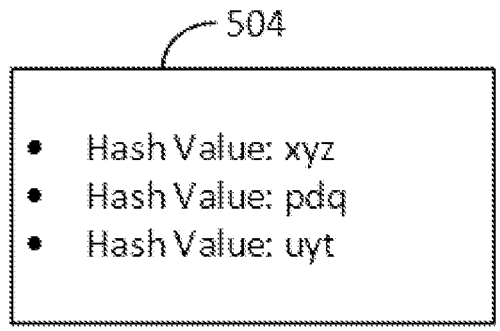
Figure 7C:
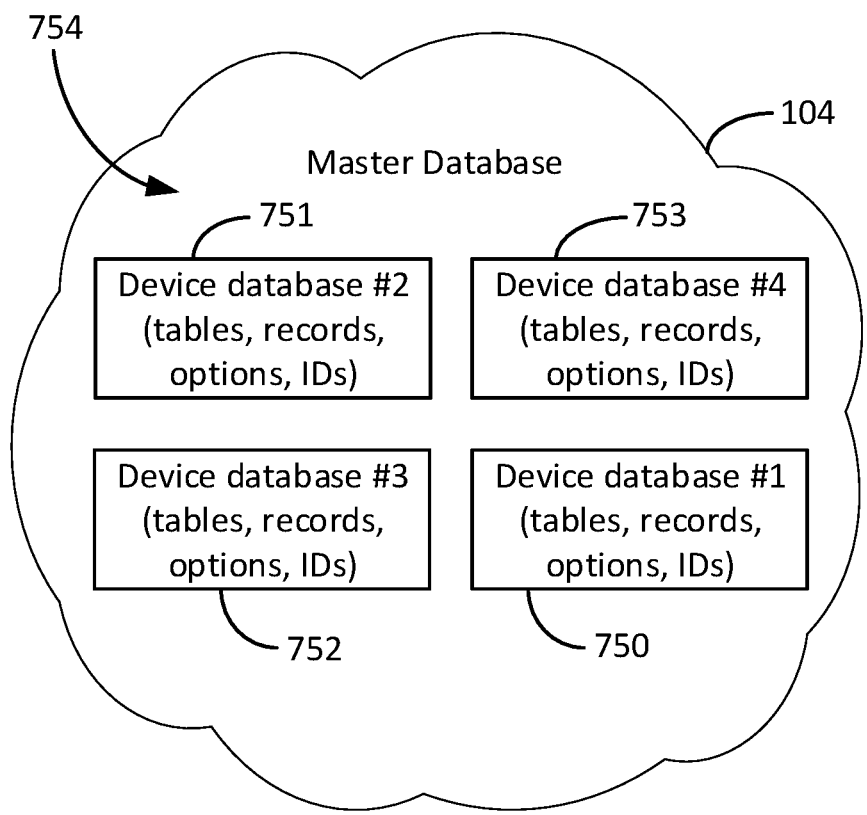

FIGS. 7A-7C are line drawings that exemplify a master database 104 communicatively linked with a plurality of master communications arrangements and with access to the hash library 506. The hash library 506 is used in setting up specific device databases consistent with embodiments of the present invention. FIG. 7A illustratively depicts a networked environment 700 used in conjunction with FIG. 7B. With reference to FIG. 7A, there are four master communications device arrangements 702, 704, 706 and 708 (depicted in the dashed ovals) that each comprise a master communications device with external components connected thereto. More specifically, master communications device arrangement 702 includes master communications device #1 102 connected with external components 115 and 120. Likewise, master communications device arrangement 704 includes an identically configured master communications device #2 722 with identically configured external components 115B and 120B. The master communications devices #1 102 and #2 722 have different serial numbers and/or other unique indicia, and the four external components 115, 120, 115B and 120B attached to master communications devices #1 102 and #2 722 each have different serial numbers and/or other unique indicia. Master communications device arrangement 706 includes master communications device #3 723 with attached external components 730, 731 and 733. Master communications device arrangement 708 includes master communications device #4 724 with attached external components 734, 733, 730, 733, and 735.

FIG. 7B illustratively depicts a block diagram representation of the hash table/library 504 embodiment that already contains the different hash values for each master communications device arrangement 702, 704, 706 and 708 that were previously stored in the master database 104 consistent with embodiments of the present invention. To better explain steps 610-620, assume master devices 704, 706 and 708 are already attached to the master database 104. Based on the configurations of the master communications device arrangements 704, 706 and 708, the hash values for the corresponding device arrangement data packets are 'xyz', 'pdq' and 'uyt', respectively.

As shown in FIG. 7C, the master database 104 possesses device database #2 751, device database #3 752 and device database #4 753 that each correspond to master communications device arrangements 704, 706 and 708, respectively. Optional embodiments envision a single database wherein the devices 102, 722, 723 and 724 accessing the master database 104 each have their own rows in a common table, as will be discussed later. Certain embodiments envision each device database set up to possess a plurality of tables configured to acquire sensor data and acquire action data for action related components/subcomponents corresponding to their respective master communications device arrangement to which the components are connected. Hence, master communications device arrangement #2 704 possesses its own database in accordance with its device definitions data packet 400. Arrangement #2 704 has corresponding individual tables configured to acquire sensor information in accordance with the component definitions 402 of the parameters defined in each data packet 350. Arrangement #2 704 further has the component configurations of 404 that correspond with the hash value 'xyz'. Likewise, master communications arrangement #3 706 possesses tables which correspond to the hash value 'pdq' and master communications arrangement #4 708 possesses tables which correspond to the hash value 'uyt'. Other embodiments envision setting up individual databases wherein each database has pointers to common tables that point to their respective data entries. Referring back to steps starting with 610, master communications device arrangement #1 702 is in the process of being attached (indicated by the dotted double arrow 108) to the master database 104. Master communications device arrangement #1 702 is identical to communications device arrangement #2 704, which has already been set up in the master database 104 with the appropriate tables. Accordingly, a new device database specifically for master communications device arrangement #1 702 can be set up in the master database 104 based on the previously stored setup instructions (tables) of master communications device arrangement #2 704 already in the master database 104. Hence, device database #1 750 is constructed quickly and efficiently based on set up information already present in the master database 104. The newly constructed device database #1 750 is tagged with the unique indicia for master communications device arrangement #1 702.

FIG. 6B illustratively depicts an example of steps involved with setting up a device database using the master communications arrangement 702 consistent with embodiments of the present invention. FIG. 6B is described in view of FIG. 7. With reference to step 622 (FIG. 6A), when the newly connected master communications arrangement 702 is communicatively connected to the master database 104, the data packet 400 that defines the master communications arrangement 702 (including all unique indicia) is transmitted to the master database 104. In step 624, a device database 750 is constructed specifically for the master communications arrangement 702. Accordingly, with respect to FIG. 7A, the master database 104 will include a dedicated device database 750, 751, 752, and 753 for each respective master communications arrangements 702, 704, 706, and 708. Some embodiments envision construction of the device database 750 accomplished via the table generator 520 in the master database 104. While other embodiments envision utilizing an already generated common master table that populates a specific row in the common master table for each specific master communications arrangement 702, 704, 706 and 708. In other words, the common master table embodiment is envisioned already constructed with all of the necessary columns for any kind of input data from a component (sensor or otherwise) wherein a new row is constructed with every incoming entry for a specific master communications arrangement, such as 702 for example.

As shown in step 626, when the master communications arrangement 702 is newly connected to the master database 104, component configuration options (which can be adjusted/changed) is provided to the end-user 106. Equipped with the component configuration options, as shown in step 628, the end-user 106 can then adjust the component configurations and any triggers/limits based on their specific requirements. Step 630, certain embodiments envision one or more of the user adjusted component configurations being sent from the master database 104 to the master communications device 102 where the user adjusted configurations reconfigures or otherwise replaces the default option values in the master communications arrangement 702 that originally accompanied the master communications arrangement 702. In step 632, with the master database 104 and the master communications device 102 now configured and set up, the master communications device 102 and the master database 104 can cooperate to accumulate data and execute controlled output activities collectively.

Figure 8A:
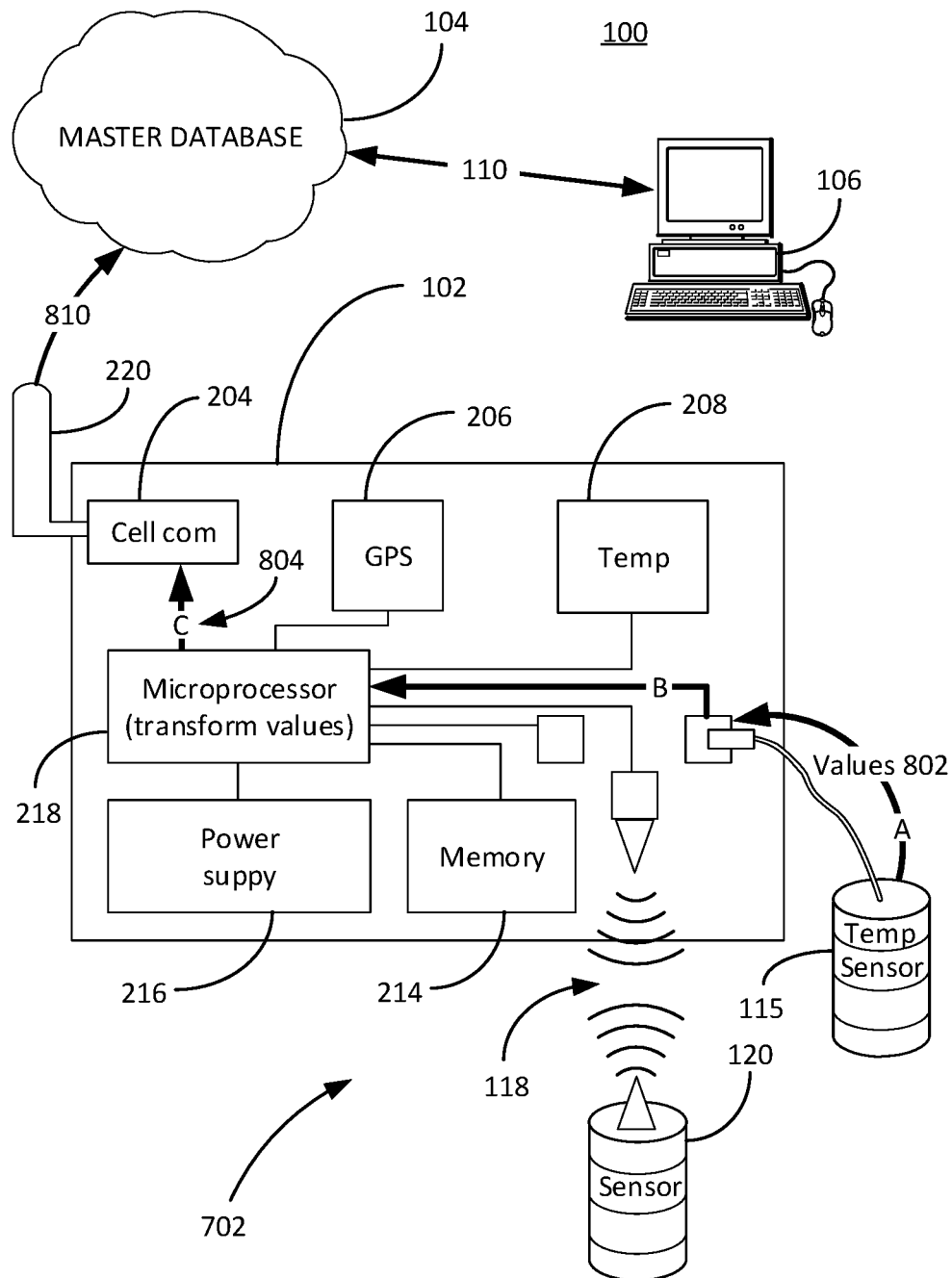
FIGS. 8A-8C illustratively show certain embodiments of streamlined and agnostic data transmission consistent with embodiments of the present invention.
Figure 8B:
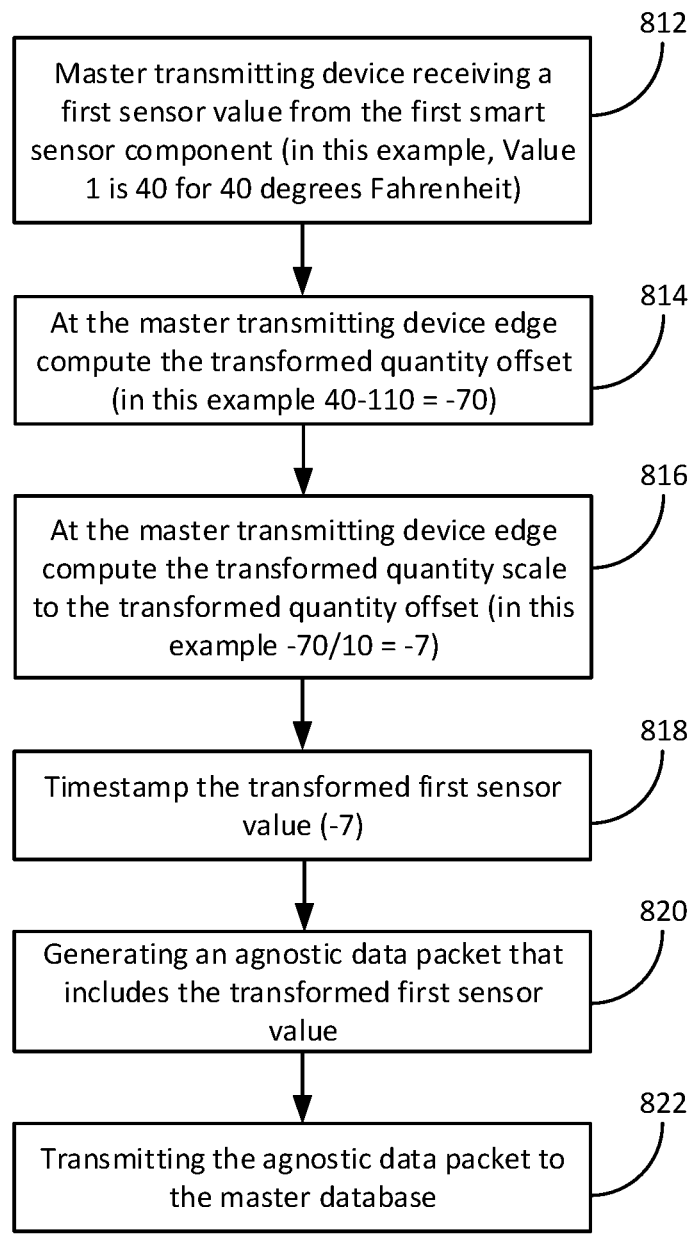
Figures 8C, 9A:
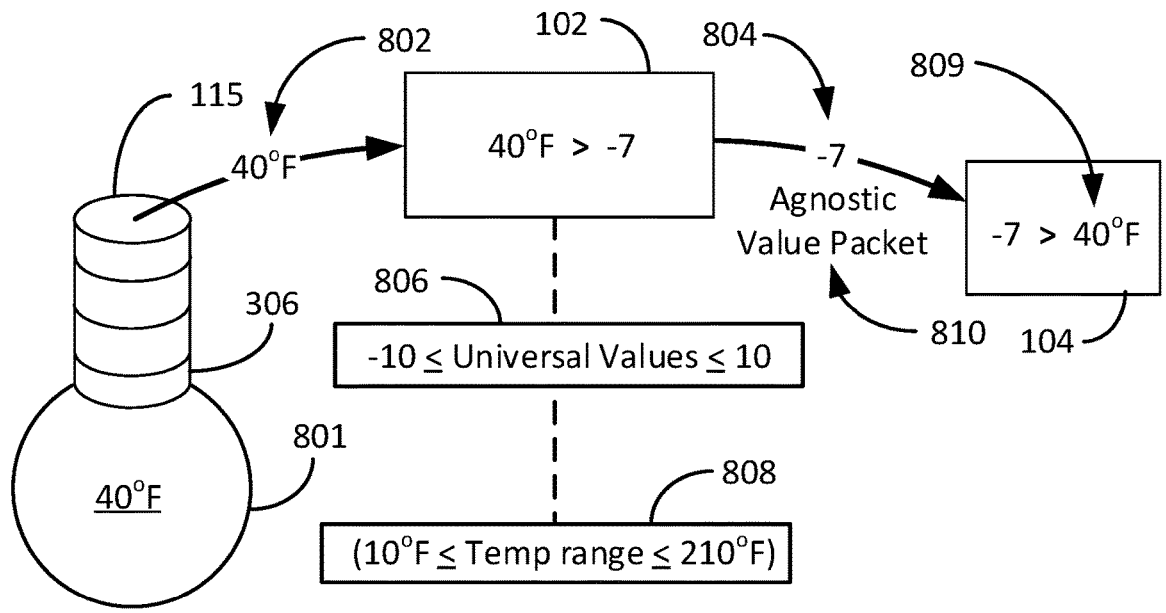
FIGS. 9A and 9B illustratively depict the construction of a device database table row embodiment in the master database consistent with embodiments of the present invention.

FIGS. 8A-8C illustratively show certain embodiments of streamlined and agnostic data transmission consistent with embodiments of the present invention. With the master database 104 and the master communications device 102 configured and set up as shown in FIG. 8A, FIG. 8C pictorially illustrates aspects of the method embodiment of FIG. 8B which shows a method for constructing a database 750 with a data acquisition example consistent with embodiments of the present invention. For purposes of explanation, FIGS. 8A-8C are generally directed to the master communications arrangement 702, which includes the component data packet 350 for the external smart sensor components 115 and 120, in addition to master communications arrangement definitions 400.

As previously shown, the master communications device 102 has edge-computing capability by way of the microprocessor 218 and the memory 214. Based on the configuration and set up (described in conjunction with FIGS. 6A and 6B), FIG. 8A shows the master communications device 102 is arranged and configured to receive sensor generated values 802 from an attached external component 115. The sensor generated values 802 are transmitted to the master communications device 102 along pathway "A" and then to the microprocessor 218 along pathway "B" for transformation into an agnostic value 804. More specifically, the received sensor generated values 802 are transformed into agnostic values within a standard (agnostic) range of values (agnostic value) 806 via an algorithm in the microprocessor 218. The agnostic values 804 are sent as part of the agnostic value package 810 to the cellular communications chip 204 along the path "C" where the agnostic values 804 are finally transmitted to the corresponding database 750 in the master database 104. The agnostic values 804 can be converted in the master database 104 back to the original sensor values, that is as recovered sensor values 809.

In the present example, the range 806 of agnostic values 802 is between −10 and +10 (shown as an algorithm in the master communications device 102 by the dashed line), which is used for all agnostic values consumed by the master database 104. It should be recognized that the range of agnostic values can be different than −10 to +10 so long as the range is consistently used for all incoming values to the master database. By way of example and with reference to FIGS. 8B and 8C, the first external smart sensor component 115 measures the temperature of an object 801 via a temperature sensor 306 as 40° F. The raw sensor value (Value-1) of 40° F. (or some electrical signal corresponding to 40° F., such as a thermocouple voltage) is transmitted to the master communications device 102, step 812. Component-A 115 possesses a single temperature sensor 306 that measures temperatures in a range 808 from between 10° F.-210° F., which is known to the master communications device 102 as indicated by the dashed line. For purposes of illustration, degrees Fahrenheit is shown but in reality degrees Fahrenheit is likely not present because a dimensionless value is more streamlined for data bandwidth transmission. Based on the component data packet 350 (component definition of FIG. 3), the transformed quantity offset is 110 and the transformed quantity scale is 10 for 1:10 (as shown in the reading value definition 366). Accordingly, as shown in step 814, Value-1 802 is first transformed by the microprocessor 218 with a quantity offset of 110, which mathematically is 40−110=−70. Next, as shown in step 816, the transformed quantity scale of 1:10 is applied to the transformed offset of Value-1 802, which mathematically is −70÷10=−7. As shown in step 818, the master communications device 102 tags the transformed Value-1 804 (−7, which is an agnostic value) with a timestamp in accordance with the component definition included in the component data packet 350. In step 820, an agnostic value packet 810 is generated to include the transformed Value-1 (−7) 804, the timestamp, and an index (sensor "0" out of "n" sensors in the master communications arrangement 702) from Component-A 115 and indicia (102) from the master communications device 102. In this embodiment, the agnostic value packet 852 does not include sensor type (in this case a temperature sensor) or a pre-transformed sensor value (in this case 40° F.), but rather is a simplified universal packet of data that is agnostic to any sensor or data generating component.

One example of the data packet includes the Device ID (102), timestamp (1/9/19 01:00), component index (0), sensor index (0), sensor values index (0), and reading value (−7). In step 822, the agnostic data packet 852 (102, 1/9/19 01:00, 0, 0, 0, −7) is sent from the microprocessor 218 to the cellular communications chip 204 and transmitted 108 to the master database 104 using a database address (such as an Internet IP address) maintained in the device memory 214.

Figure 9B:
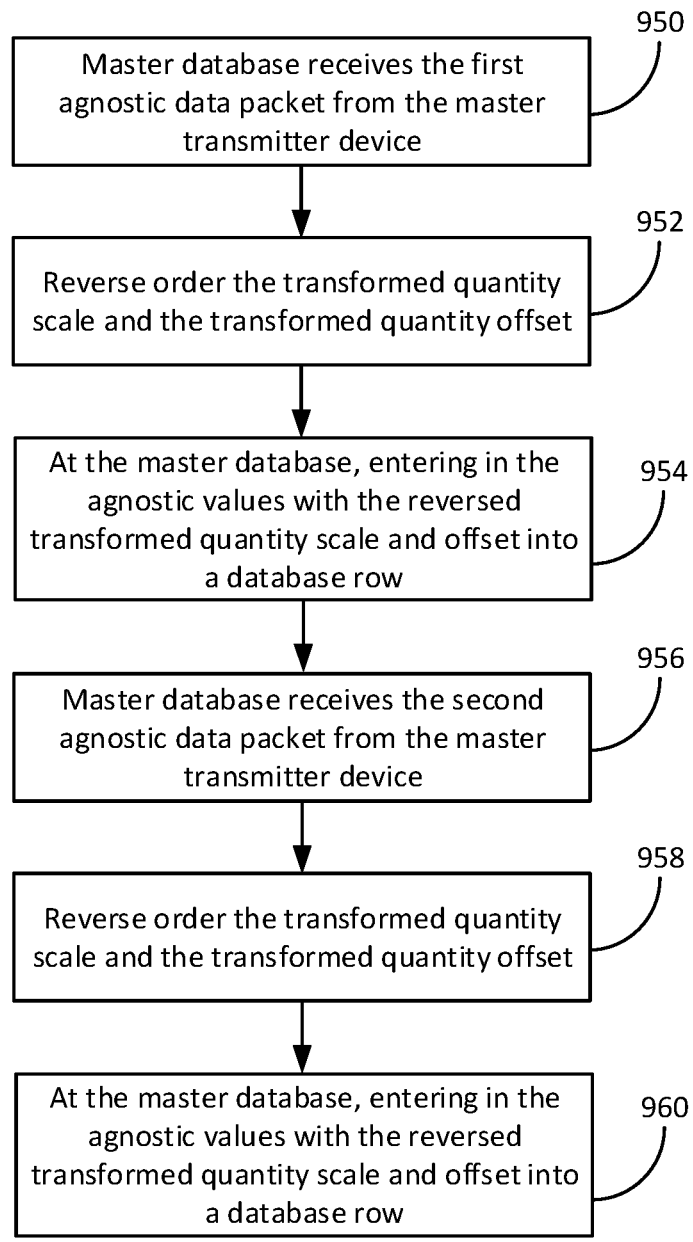

FIGS. 9A and 9B illustratively depict the construction of a device database table row embodiment in the master database 104 consistent with embodiments of the present invention. Instead of individual device databases and corresponding individual data acquisition table in the master database 104 as described earlier, this embodiment contemplates a single table 900 that acquires data for every master transmission device that accesses the master database 104. The table 900 is set up to acquire data in rows according to the column values. The column values include Device ID 902, Timestamp 904, Component Index 906, Sensor Index 908, Sensor Value Index 910, Reading Value 912, and Reading Value Status 914. Continuing with the embodiment of FIG. 9A and from FIG. 9B step 822, the agnostic data packet 852 (102, 1/9/19 01:00, 0, 0, 0, −7) is received by the master database 104, step 950. As a side note, software engineers often translate elements "1-10" as "0-9", this is called 0-based indexing. This convention is used in this example. The master database 104 has knowledge of the options and parameters associated with the agnostic values sent from the master communications device 102. Certain embodiments envision the Device ID being constructed at the master database 104 from the source address, which is the master communications device 102. In in this embodiment, only the timestamp, indexes and agnostic value is in the data packet. Based on the original set up for the master communications device 102, the indexes are already referenced to components and subcomponents within the master communications arrangement 702. In this embodiment, as shown in step 952, the agnostic sensor Value 1 is reverse order transformed in the quantity scale and quantity offset to bring Value 1 back to 40. Certain other embodiments envision the value of −7 being left in the table and the reverse order transformation provided on the fly to the end-user 106 when the data is viewed.

FIG. 9B shows the reading value at step 954; a first row 916 for the agnostic data packet 852 with the reverse order transformation specifically for the master communications device 102 is populated as shown in FIG. 9A. At step 956, a second agnostic data packet (102, 1/9/19 01:05, 0, 0, 0, −5) is sent from the master communications device 102 after taking a second measurement. At step 958, the second agnostic data packet value is transformed back to its original value of 60 (from the agnostic value of −5). At step 960, a second row 918 is populated (102, 1/9/19 01:05, 0, 0, 0, 60, OK) in the table 900. Information from the table 900 can be displayed to an end-user 106 by way of a computer monitor or other display device, for example. The displayed table 900 can tag associative information with the record, such as in table 900, which can include icons, symbols, or other language associated with the database definition.

Figure 10A:
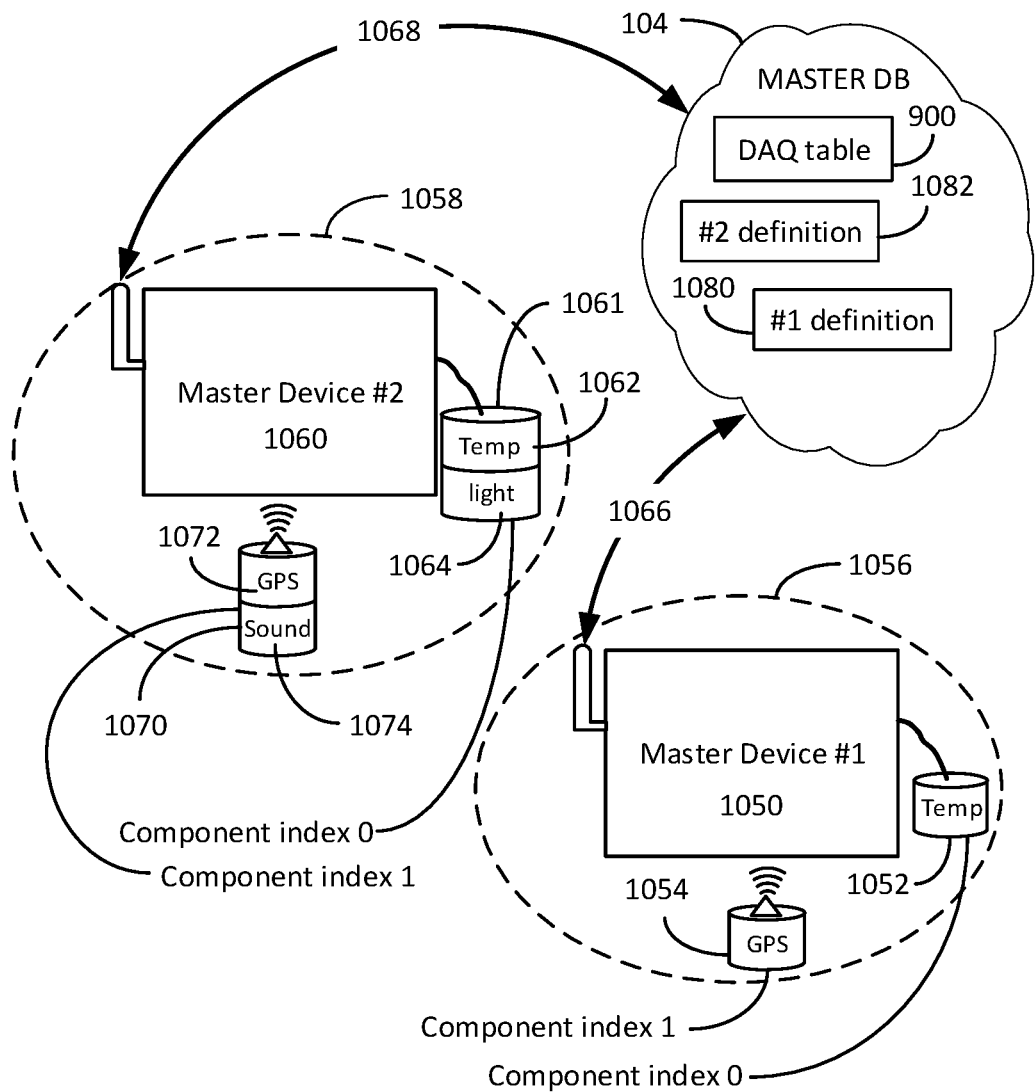

FIGS. 10A and 10B illustratively depict the construction of a device database table row embodiment in the master database 104 consistent with embodiments of the present invention. Instead of constructing a master database with an independent database for each individual master communications device, the present embodiment envisions the master database 104 maintaining individual records for each master communications device while using a common data acquisition table 900 having the same set up as in FIG. 9A.

The layout of FIG. 10A generally shows two master communications device arrangements 1056 and 1058 that are communicatively linked to the master database 104 via wireless connections 1066 and 1068, respectively. The first master communications device 1050 is connected with a temperature component 1052 and a GPS component 1054, which collectively comprise the first master communications device arrangement 1056. Likewise, the second master communications device 1060 is connected to a combination temperature and light component 1061 and a combination GPS and sound component 1070, which collectively comprise the second master communications device arrangement 1058. The master database 104 possesses a data acquisition table 900 configured and arranged to collect data for the first master communications device arrangement 1056 in accordance with the first definition 1080 and for the second master communications device arrangement 1058 in accordance with the second definition 1082. Obviously to collect data, the master database 104 has been set up with the first definition 1080 and the second definition 1082.

With respect to setting up the data acquisition table 900, the first master communications device 1050 obtains the definition corresponding to the temperature sensor 1052 and the definition corresponding to the GPS 1054. The definitions for the first master communications device 1050, the GPS 1054 and the temperature sensor 1052 (also comprising their identifiers/unique indicia) collectively comprise the first master communications device arrangement definition 1080, which is transmitted 1066 to the master database 104 where it is maintained as definition #1 1080. Likewise, the second master communications device 1060 obtains the definition corresponding to the combination temperature and light component 1061 (meaning the definitions for the temperature sensor 1062 and the light sensor 1064 in addition to their unique indicia) and the definition corresponding to the combination GPS and sound component 1070 (meaning the definitions for the GPS sensor 1072 and the sound sensor 1074 in addition to their unique indicia). The definitions of the second master communications device 1060, the combination temperature and light component 1061 and the combination GPS and sound component 1070 (also comprising their identifiers/unique indicia) collectively comprise the second master communications device arrangement definition 1082, which is transmitted 1068 to the master database 104 where it is maintained as definition #2 1082.

With reference to FIG. 10B, the table 900 is first populated with data sent from the first master device 1050 at a timestamp of 4/19/2019 01:00 in the $1^{st}$, $2^{nd}$, and $3^{rd}$ rows 1002, 1004 and 1006, respectively. The software convention of translating "1-10" to "0-9" is used in this example. As shown, the first component 1052 comprises a single sensor capable of obtaining one reading at a time and the second component 1054 comprises a single sensor capable of obtaining two readings at the time (GPS sensor with x and y coordinates). The $1^{st}$ row 1002 displays the Device ID "1050" (the device from which a reading is coming from), Timestamp 4/19/2019 01:00, Component Index "0" for being the first component 1052 in the first arrangement 1056, Sensor Index "0" for being the first and only sensor (temperature sensor) in the first component 1052, Sensor Value Index "0" for being the only sensor reading from the first sensor, Reading Value "40" (corresponding to 40° F.) which is the reverse order transformed quantity scale and offset from the value received from the first master communications device 1050, and Reading Value Status "OK" which means that the reading was good. The $2^{nd}$ row 1004 displays the Device ID "1050", Timestamp 4/19/2019 01:00, Component Index "1" for being the second component 1054 in the first arrangement 1056, Sensor Index "0" for being the first and only sensor (GPS sensor) in the second component 1054, Sensor Value Index "0" for being the first sensor reading from the first sensor (GPS sensor), Reading Value "39.7392" (latitudinal measurement) which is the reverse transformed quantity scale and offset from the value received from the first master communications device 1050, and Reading Value Status "OK". The $3^{rd}$ row 1006 displays the Device ID "1050", Timestamp 4/19/2019 01:00, Component Index "1" for being the second component 1054 in the first arrangement 1056, Sensor Index "0" for being the first and only sensor (GPS sensor) in the second component 1054, Sensor Value Index "1" for being the second sensor reading from the second sensor (GPS sensor), Reading Value "−104.9903" (longitudinal measurement) which is the reverse transformed quantity scale and offset from the value received from the first master communications device 1050, and Reading Value Status "OK".

With continued reference to FIG. 10B, table 900 is next populated with data sent from the second master device 1060 at a timestamp of 4/19/2019 01:10 in the $4^{th}$, $5^{th}$, $6^{th}$, $7^{th}$ and $8^{th}$ rows 1008, 1010, 1012, 1014 and 1016 respectively. As shown, the second arrangement 1058 is linked with a first component 1061 comprising two sensors (a temperature sensor 1062 and a light sensor 1064) each capable of one reading at a time, and a second component 1070 comprising two sensors (a GPS 1072 and the sound sensor 1074). The GPS 1072 is capable of obtaining two readings at a time and the sound sensor 1074 is capable obtaining one reading at a time. The $4^{th}$ row 1008 displays the Device ID "1060", Timestamp 4/19/2019 01:10, Component Index "0" for being the first component 1061 in the second arrangement 1058, Sensor Index "0" for being the first sensor (temperature) 1062 in the first component 1061, Sensor Value Index "0" for being the first and only sensor reading from the first sensor 1062, Reading Value "60" (corresponding to 60° F.) which is the reverse order transformed quantity scale and offset from the value received from the second master communications device 1060, and Reading Value Status "OK" which means that the reading was good. The $5^{th}$ row 1010 displays the Device ID "1060", Timestamp 4/19/2019 01:10, Component Index "0" for being the first component 1061 in the second arrangement 1058, Sensor Index "1" for being the second sensor (light sensor) 1064 in the first component 1061, Sensor Value Index "0" for being the first (and only) sensor reading at a given time (timestamp) from the second (light) sensor 1064, Reading Value "450" (corresponding to 450 lm) which is the reverse transformed quantity scale and offset from the value received from the second master communications device 1060, and Reading Value Status "OK". The $6^{th}$ row 1012 displays the Device ID "1060", Timestamp 4/19/2019 01:10, Component Index "1" for being the second component 1070 in the second arrangement 1058, Sensor Index "0" for being the first sensor (GPS sensor) 1072 in the second component 1070, Sensor Value Index "0" for being the first sensor reading from the first sensor (GPS sensor) 1072 at the timestamp, Reading Value "30.2345" (latitudinal measurement) which is the reverse transformed quantity scale and offset from the value received from the first master communications device 1060, and Reading Value Status "OK". The $7^{th}$ row 1014 displays the Device ID "1060", Timestamp 4/19/2019 01:10, Component Index "1" for being the second component 1070 in the second arrangement 1058, Sensor Index "1" for being the first sensor (GPS sensor) 1072 in the second component 1070, Sensor Value Index "0" for being the second sensor reading from the first sensor (GPS sensor) 1072 at the timestamp, Reading Value "60.5678" (longitudinal measurement) which is the reverse transformed quantity scale and offset from the value received from the first master communications device 1060, and Reading Value Status "OK". The $8^{th}$ row 116 displays the Device ID "1060", Timestamp 4/19/2019 01:10, Component Index "1" for being the second component 1070 in the second arrangement 1058, Sensor Index "1" for being the second sensor (sound sensor) 1074 in the second component 1070, Sensor Value Index "0" for being the first (and only) sensor reading at the timestamp from the second (sound) sensor 1074, Reading Value "82" (corresponding to 82 dB) which is the reverse transformed quantity scale and offset from the value received from the first master communications device 1060, and Reading Value Status "OK".

With reference to the final entries in FIG. 10B, table 900 is next populated with data once again sent from the first master device 1050, this time at a timestamp of 4/19/2019 01:15 in the $9^{th}$, $10^{th}$ and $11^{th}$ rows (entries) 1018, 1020 and 1022 respectively. The $9^{th}$ row 1018 displays the Device ID "1050", Timestamp 4/19/2019 01:15, Component Index "0" for being the first component 1052 in the first arrangement 1056, Sensor Index "0" for being the first and only sensor in the first component 1052, Sensor Value Index "0" for being the only sensor reading from the first sensor, Reading Value "45" (corresponding to 45° F.) which is the reverse order transformed quantity scale and offset from the value received from the first master communications device 1050, and Reading Value Status "OK". The $10^{th}$ row 1020 displays the Device ID "1050", Timestamp 4/19/2019 01:15, Component Index "1" for being the second component 1054 in the first arrangement 1056, Sensor Index "0" for being the first and only sensor (GPS sensor) in the second component 1054, Sensor Value Index "0" for being the first sensor reading from the first and only sensor (GPS) at the timestamp, Reading Value "39.7392" (latitudinal measurement), and Reading Value Status "OK". The $11^{th}$ row 1022 displays the Device ID "1050", Timestamp 4/19/2019 01:15, Component Index "1" for being the second component 1054 in the first arrangement 1056, Sensor Index "0" for being the first and only sensor (GPS sensor) in the second component 1054, Sensor Value Index "1" for being the second sensor reading from the second sensor (GPS sensor) at the timestamp, Reading Value "−104.9903" (longitudinal measurement), and Reading Value Status "OK".

In the above described table 900 of FIG. 10B, the rows simply display values with the exception of the last column which is a Boolean string "OK". Certain other embodiments envision a presentation of units, trigger values, actions, etc. that can be arranged according to an end-user 106. Optionally, certain embodiments envision a universal table that maintains the minimal and essential information for each reading (row). The master database 104 can then construct from the universal table a viewable presentation of desired information either in tabular form or some other format tailored to an end-user 106.

Certain embodiments envision action producing components, such as an LED or sound producing device, receiving action commands from the master database 104 by way of simple dimensionless values (much like the data values sent to the master database 104 from a master communications device). The simple dimensionless action producing values are envisioned to be converted at the master communications device and sent to the respective action producing components to produce or otherwise execute those actions.

Figure 10C:
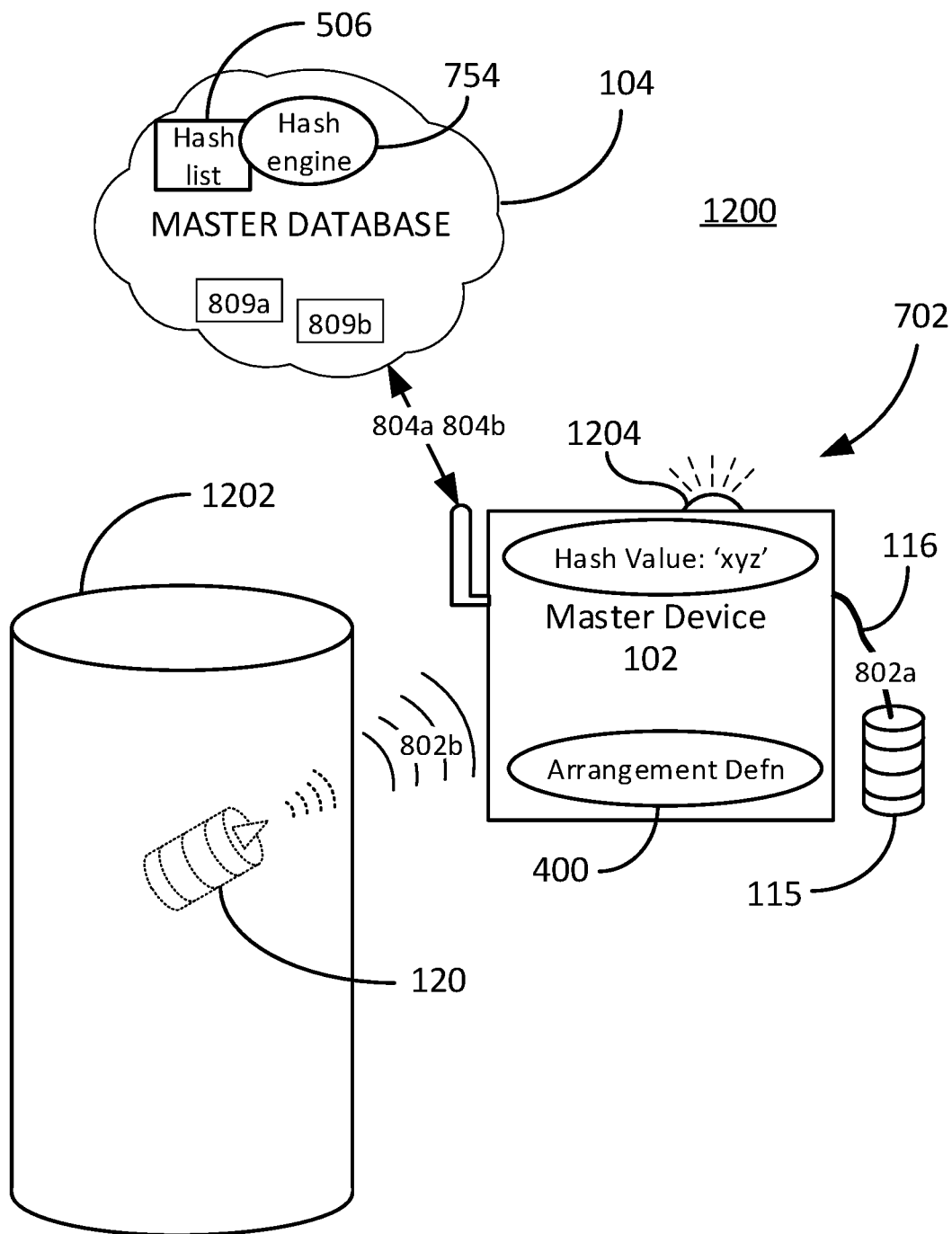
FIG. 10C shows a block diagram of a system embodiment that includes a master communications arrangement and master database consistent with embodiments of the present invention.

FIG. 10C shows a block diagram of a system embodiment 1200 that includes a master communications arrangement 702 and master database 104 consistent with embodiments of the present invention. The master communications arrangement 702 includes the master communications device 102 connected to two external components 115 and 120. The two external components 115 and 120 in this example are temperature sensor components, such as thermocouples, which can either be smart or dumb sensors. The first temperature component 115 is connected to the master device 102 via a wireline 116 and the second temperature component 120 is connected to the master device 102 wirelessly. The second temperature sensor 120 is disposed inside of a barrel 1202 and wirelessly transmits raw temperature data 802b from inside of the barrel 1202 to the master device 102. The first temperature sensor 115 resides outside of the barrel 1202 and transmits ambient temperature data 802a to the master device 102, which in some cases is raw temperature data.

The master communications arrangement 702 is configured to transmit data and other information via a communications link to the master database 104. The communications link is a connection to the master database 104, which can be wireless, a wireline, or some combination thereof. An arrangement definition 400, retained in the master device 102, comprises at least a unique indicia and set of instructions. The set of instructions can include, but is not limited, to at least a conversion algorithm, data acquisition instructions, display instructions, data interaction instructions, output instructions, configuration options, layout instructions, just to name a few examples. The set of instructions in the arrangement definition 400 equip the master database 104 to construct data acquisition fields in a private table or in a shared table 900 for data coming in from the master communications arrangement 702.

The master database 104 comprises a hash comparison engine 754 that compares the hash function 'xyz' of the master communications arrangement 702 with a library of hash definitions 506 when first setting up the master communications arrangement 702 with the master database 104. Some embodiments envision each element that makes up the master communications arrangement 702 sending its own hash function, such that if there is one or more common components upload time can be saved. If the hash function 'xyz' is not in the library of hash definitions 506 then the arrangement definition 400 (or optionally an individual component or element definition 350) will automatically upload to the master database 104, typically based on back-and-forth communications between the master device 102 and the master database 104. A data acquisition table 900 configured for the specific master communications arrangement 702 is enabled to acquire data based on the definition/s 350 and 400. Layout instructions in the definitions 350 and 400 enable the end-user 106 to configure display data and symbols in a customized layout in the data acquisition table 900. This can include units of measure, the number of digits after the decimal point, data rounding, scientific notation, icons, and accuracy text. One example of an accuracy text is a temperature that displays an accuracy range, such as 9° F.+/−1.5° F. Though displayed, data and symbols are envisioned to be first received with default configurations. Some embodiments further imagine at least one of these default configurations being reconfigurable under a set of instructions that include configuration options.

With continued reference to the system embodiment 1200, once set up, the first component 115 transmits ambient temperature readings 802a to the master device 102 while the second component 120 wirelessly transmits barrel interior temperature readings 802b to the master device 102. The data sampling rate (frequency of data sampling) can be controlled either by the master device 102 or by the master database 104, which in some cases is directed by the end-user 106. The conversion algorithm in the master device 102 converts (i.e., provides instructions to convert) raw sensor data 802a and 802b into agnostic sensor data 804a and 804b. The master database 104 uses the conversion algorithm to reconstruct the data 809a and 809b from the agnostic sensor data 804a and 804b coming in from the master device 102. Some embodiments envision the agnostic sensor data 804a and 804b being entered in the master database 104 but with a decoder at the master database 104 that converts the agnostic senor data 804a and 804b 'on the fly' for viewing. Data acquisition instructions from the arrangement definition 400 dictate, to the master database 104, how the reconstructed sensor data 809a and 809b are to be stored to the master database 104. Further data acquisition instructions can include sensor data logging frequency (how often/frequently the database 104 will log data inputs, such as once every 10 minutes or once every hour, etc.). While data can be converted and displayed as received, certain embodiments envision that instead of displaying aberrant data that exceeds the data range 806, an "out-of-range" message is displayed either alone or with the out of range value. Displaying instructions can be tailored to how the reconstructed sensor data 809a and 809b is to be displayed to an end-user 106. For example, this can include instructions to change things like background color if there is a sensor value 809a or 809b above a certain level. These instructions can be added by an end-user 106, for example, later than when the arrangement definition 400 was originally sent to the master database 104.

Because the sensor values 809a and 809b are taken from an ambient environment in addition to the inside of the barrel 1202, respectively, data interaction instructions can map how the sensor values 809a and 809b are to interact. Interacting data can include influencing, mathematical renditions of data generated from at least two sensors, etc. In this example, a differential between the two sensor values 809a and 809b will generate hybrid data that can be displayed in yet a different field in the table 900. Hybrid data can be the result of mathematical manipulation, which can be as simple as adding or subtracting generated data to far more complex algorithms. Other elements in the arrangement definition 400 can include informational text and graphics. It should be appreciated that two or more sensing components do not need to be connected to a common master communications device. In the event there are multiple master communication devices, some embodiments envision the multiple master communication devices comprising a communication pathway that does not include the master database 104.

Through data analysis, the master database 104 can be equipped with output instructions, which can be included in the arrangement definition 400, to provide signals to an end-user 106 about the input data 809a and 809b. In one example, if an input data value 809a and 809b or a combined/interacting value exceeds a certain predefined limit threshold; output instructions can be sent to the master device 102 to cause an action with an output component. For example, if an interacting value indicates that the barrel 1202 is getting too hot relative to the ambient environment, a light or siren 1204 can be activated to alert an end-user 106 of an important measured event or change. Optionally, software alerts, such as email, can be sent to an end-user 106. Frequency of output data or other transmissions can be adjusted by an end-user 106 via certain configuration options.

In the event a third component (not shown) is added to the master communications arrangement 702, a third component definition 350 is sent to the master database 104 wherein the third component definition 350 is applied or otherwise configured to the table 900 for the master communications arrangement 702. The third component definition 350 can either come from the third component, if it is a smart component, or from an independent source, such as software loaded to the master device 102 by an operator, for example. The new component definition 350 can be an addition to the table 900 or can optionally be an amendment to pre-existing component configurations, or definition/s, within the table 900. Also, it should be appreciated that amendments can be made for the master communications arrangement 702 by changing or adding to the arrangement definition 400. Though the table 900 is used in this example, it should be recognized that the table 900 is simply used for exemplary purposes and that different tables can be interchangeably used without departing from the present invention.

Figure 11A:
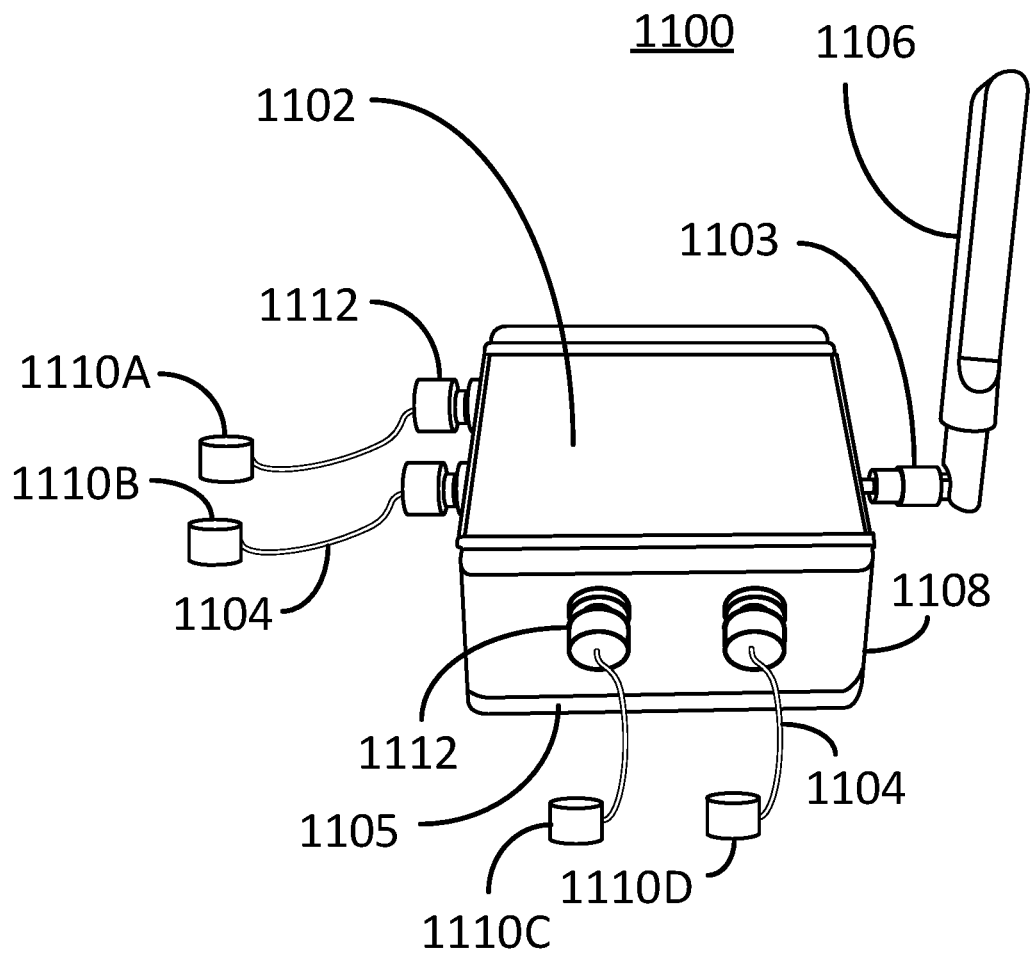
FIGS. 11A and 11B illustratively depict line drawings of a commercial embodiment of a master communications device arrangement consistent with embodiments of the present invention.
Figure 11B:
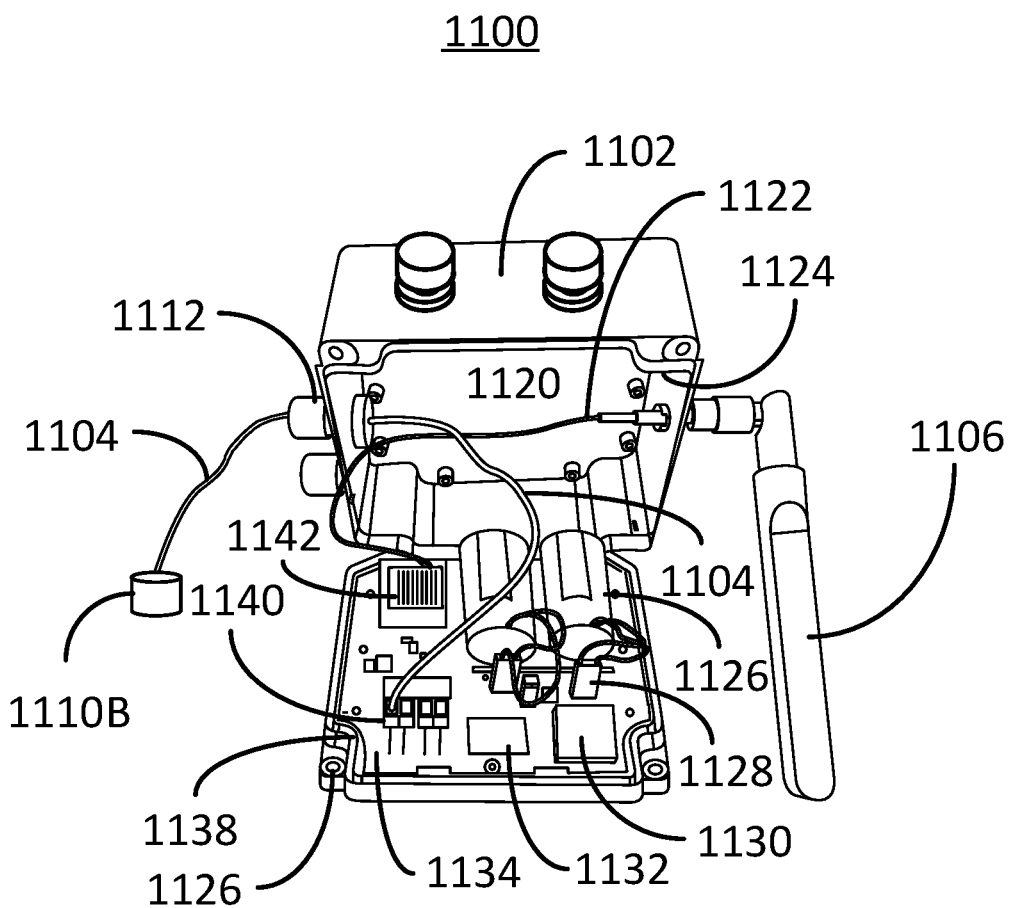

FIGS. 11A and 11B illustratively depict line drawings of a commercial embodiment of a master communications device arrangement produced by Phase IV Engineering, Inc., of Boulder Colorado, consistent with embodiments of the present invention. FIG. 11A depicts a master communications device arrangement 1100 that includes a master communications device 1102 connected to four external components 1110A, 1110B, 1110C and 1110D. The master communications device 1102 comprises an antenna 1106 that is pivotally adjustable about pivot point 1103. The four external components 1110A-1110D are tethered to the master communications device cover 1108 by way of wirelines 1104. The gasket attachment sleeves 1112, which in some embodiments is made out of rubber, serves as both a strain reliever to the wirelines 1104 and provides a barrier to prevent liquid from migrating inside of the master communications device 1102.

FIG. 11B depicts the master communications device arrangement 1100 with the cover 1108 open revealing the interior space 1120. For reference, the external component 1110B is shown tethered to master communications device 1102 via the wireline 1104 and strain reliever 1112. The wireline 1104 is attached to a printed circuit board (PCB) 1134 by the wireline connector cooperating with an external component connector 1140. The external component 1110B can electronically transmit its definition to the microcontroller 1130 which can be managed for storage to the non-transient solid-state memory 1132 (both attached to the PCB 1134) when powered by the battery system 1126 that is also attached to the PCB via connectors 1128. Upon obtaining sensor data from the external component 1110B, the microcontroller 1130 can cooperate with a cellular chip 1142 to transmit data to the master database server system 104 via the antenna 1106. The antenna 1106 is connected to the cellular chip 1142 by way of antenna wireline 1122. The master communications device cover 1108 possesses a lip 1124 that mates with a channel 1138 that possesses a gasket (not shown) to essentially seal the interior space 1120 when the cover 1108 is joined with the base 1105. The cover 1108 can be fixedly attached to the base 1105 by way of bolts or screws that joined the opposing screw holes 1126.

With the present description in mind, some embodiments consistent with the present invention are presented below. The elements called out below are examples provided to assist in the understanding of the present invention and should not be considered limiting whatsoever.

One embodiment is a method for acquiring sensor information, the method comprising: providing a master database 104; providing a component 115 possessing at least one sensor 306 and component non-transient memory 302 containing a component definition data packet 350 that includes a transformation algorithm 354 adapted to convert any value sensed by the at least one sensor 306 to within a range of universal numerical values; communicatively linking the component 115 to a master communications device 102, the master communications device 102 comprising a microprocessor 218 and device non-transient memory 214, the device non-transitory memory 214 possessing a device definition 406; transferring the component definition data packet 350 to the device non-transitory memory 214; communicatively linking the master communications device 102 with the master database 104; constructing a data acquisition receptacle 750 for the master communications device 102 and the component 115; sensing a sensor value 802 via the sensor 115; transferring the sensor value 802 to the master communications device 102; at the master communications device 102, transforming the sensor value 802 to an agnostic value 804 within the range of universal numerical values 806 via the transformation algorithm 354; transmitting the agnostic value 804 to the master database 104; at the master database 104, recovering the sensor value 802 by applying the transformation algorithm 354 in reverse on the agnostic value it hundred and four; and storing the recovered sensor value 809 in the data acquisition receptacle 750.

The method embodiment further envisioning wherein the data receptacle 750 is a table with a different row corresponding to each recovered sensor value 809.

The method embodiment further contemplating wherein the component definition data packet 350 further comprises a unique ID, name and/or part number of the component, component parameters that are configurable, and component reading values. This is further envisioned wherein the component reading values further comprise one or more: value display name, value unit, value icon, value display format, value calibration method, and value transformation parameters.

The method embodiment further comprising before the constructing step and after the communicatively linking the master communications device 102 with the master database 104, transmitting the component definition data packet 350 and the device definition 406 to the master database 104.

The method embodiment further imagining wherein the master database 104 comprises a list of all accumulated attributes 500 from which a subset is selected by the master communications device 102 and the component 115. This is further contemplated wherein the list of all accumulated attributes 500 is a complete library of all sensor attributes as accumulated from the component definition data packet 350.

The method embodiment further considering wherein the component definition data packet 350 further includes a configurable sensor parameter 356 that can be set with an upper limit value and/or a lower limit value and further comprising triggering an alarm when one of the sensor readings 802 is at or higher than the upper limit and/or is at or lower than the lower limit.

The method embodiment further comprising configuring the master database 104 with an upper limit and/or a lower limit on the recovered agnostic value. This embodiment can further comprise generating an alarm if the upper limit or the lower limit is reached.

The method embodiment further contemplating wherein the component 115 communicatively links to the master communications device 102 by way of a wireline 116.

The method embodiment further contemplating wherein the step for communicatively linking the master communications device 102 with the master database 104 is accomplished by wirelessly connecting the master communications device with an Internet access hub that is Internet connected, the master database 104 connected to the Internet.

The method embodiment further contemplating wherein the data acquisition receptacle 750 is a table 900 and each recovered sensor value 802 is entered in an individual row. This is further contemplated wherein the table 900 comprises a device ID column corresponding to the master communications device, a timestamp column of when the value was sensed, at least one indicia column corresponding to the sensor and/or the component, and a reading value column corresponding to the recovered sensor value 802. And optional embodiment contemplates wherein the table 900 is also universally used with a plurality of other master communications devices which create their own individual corresponding rows with each of their own corresponding recovered sensor values 809.

The method embodiment further comprising communicatively linking a second component 120 with at least a second sensor 306 to the master communications device 102; transmitting a second component definition data packet corresponding to the second component 120 to the master database 104; sensing a second component sensor value at the second component 120; transforming the second sensor value to a second agnostic value within the range of the universal numerical values 806 via a second sensor transformation algorithm; transmitting the second agnostic value to the master database 104; at the master database 104, recovering the second sensor value by applying the second sensor transformation algorithm in reverse on the second agnostic value; and storing the recovered second sensor value in the data acquisition receptacle 750.

The method embodiment further comprising communicatively linking a second master communications device 722 with the master database 104, the second master communications device 722 possessing a second component 115B with a second component definition data packet that includes a second sensor transformation algorithm; sensing a second component sensor value at the second component 115B; transforming the second sensor value to a second agnostic value within the range of the universal numerical values 806 via the second sensor transformation algorithm; transmitting the second agnostic value to the master database 104; at the master database 104, recovering the second sensor value by applying the second sensor transformation algorithm in reverse on the second agnostic value; and storing the recovered second sensor value in either the data acquisition receptacle 750 or a second data acquisition receptacle specifically corresponding to the second master communications device 722.

The method embodiment further comprising: at the master communications device 102, creating a hash value 'xyz' of the component definition data packet 350 and the device definition 406 without any unique indicia; sending the hash value 'xyz' to the master database 104 prior to any of the transmitting steps; at the master database 104, comparing the hash value 'xyz' with a library of hash values 506 retained in the master database 104, the library of hash values 506 each correspond to different previously defined component and device definitions; and if the hash value 'xyz' is not in the master database 104, loading the component definition data packet 350 and the device definition 406 with any unique indicia, if the hash value 'xyz' is in the master database, constructing the data acquisition receptacle 750 for the master communications device 102 and the component 115 from the corresponding device data packet 400.

Yet another embodiment contemplates a method for acquiring sensor information, the method comprising: providing a master database 104 that possesses a plurality of master attributes 500 and 515 that differ from one another; providing a component 115 possessing at least one sensor 306 and component non-transient memory 214 containing a component definition a component definition data packet 350 including a component subset of the master attributes and a transformation algorithm 354 adapted to convert any value 802 sensed by the at least one sensor 306 to within a range of universal numerical values 806; communicatively linking the component 115 to a master communications device 102, the master communications device 102 comprising a microprocessor 218, a transceiver 204, and device non-transient memory 214, the device non-transitory memory 214 possessing a device definition 406 defined by a device subset of the master attributes 500 and 515; transferring the component definition 406 to the device non-transitory memory 214; transmitting the component definition data packet 350 and the device definition 406 to the master database 104; constructing a data acquisition receptacle 750 for the master communications device 102 and the component 115; sensing a sensor value 802 at the sensor 306; transferring the sensor value 802 to the master communications device 102; at the master communications device 102, transforming the sensor value 802 to an agnostic value 804 within the range of universal numerical values 806 via the transformation algorithm 354; transmitting the agnostic value 804 to the master database 104; at the master database 104, recovering the sensor value 809 by applying the transformation algorithm 354 in reverse on the agnostic value 804; and storing the recovered sensor value 809 in the data acquisition receptacle 750.

Still another embodiment contemplates a component device 115 comprising: a sensor 306; a microprocessor 304; a component non-transitory memory 302; and a component definition data packet 350 retained in the non-transitory memory 302, the component definition data packet 350 includes component identification 352 and a transformation algorithm 354 adapted to convert any value sensed 802 by the sensor 306 to within a range of universal numerical values 806, the component device 115 configured to communicatively connect with a master communications device 102.

The component device embodiment further comprising at least one sensor adjustable option 356, the sensor adjustable option 356 corresponding to a subset of predefined master sensor adjustable options. This embodiment further envisions wherein the predefined master sensor adjustable options are retained in a data acquisition database 750. Optionally, this embodiment further envisions wherein the data acquisition database 750 is in a cloud server.

The component device embodiment further contemplating wherein the sensor 306 is selected from a group consisting of a temperature sensor, and acceleration sensor, a strain sensor, a Hall effect sensor, a back EMF sensor, a pressure sensor, sounds sensor, light sensor, and a location sensor.

The component device embodiment further envisioning wherein the sensor 306 is adapted to sense a sensor value 802 and transmit the sensor value 802 to the master communications device 102. This embodiment further envisions wherein the master communications device 102 adapted to essentially convert the sensor value 802 to a universal numerical value 804 within the range of universal numerical values 806 to a data acquisition database 750. The data acquisition database 750 can further be configured to convert the universal numerical value 804 essentially back to the sensed value 802.

The component device embodiment further imagining wherein the component definition data packet 350 further includes component manufacturing information, component capabilities, component communication parameters, name and/or part number of the component, configurable component parameters, and reading values provided by the sensor. This embodiment further envisions wherein the configurable component parameters includes parameter display names, parameter value types, parameter default types, and parameter constraints. Optionally the reading values include at least one of a value display name, value unit, value icon, value display format, value calibration method, and at least one value transformation parameter.

The component device embodiment further considering wherein the microprocessor 304 is configured to manage communication between the sensor 306, the component non-transitory memory 302 and the master communications device 102 when communicatively connected with the master communications device 102.

The component device of embodiment 20 wherein the component device 115 is adapted to communicatively connect with the master communications device 102 either wirelessly or by way of a wireline.

The component device embodiment further contemplating wherein the component device 115 further includes a second sensor 312 with a second sensor definition.

The component device embodiment further comprising a subcomponent 342 that is not a sensor device. This embodiment further envisions wherein the subcomponent 342 is at least one of a light, a sound producing device, or a vibration producing device.

While yet another embodiment contemplates a smart component device method comprising: providing a smart component device 115 that includes a sensor 306, a non-transitory memory 302, a component definition data packet 350 retained in the non-transitory memory 302, and a microprocessor 304, the component definition data packet 350 that includes component identification 352 and a transformation algorithm 354; communicatively connecting the smart sensor device 115 with a master communications device 102; transferring the component definition data packet 350 to a device non-transitory memory 214 comprised by the master communications device 102; the sensor 306 sensing a physical state; communicating a sensor value 802 corresponding to the physical state to the master transmitter device 102 in a form defined by at least one of sensor attribute; converting the sensor value 802 to within a range of universal numerical values 806 via the transformation algorithm 354.

The smart component device method embodiment further comprising powering the smart sensor device 115 via the master transmitter device 102.

The smart component device method embodiment further envisioning wherein the form defined by the sensor attribute includes a predefined number of digits after a decimal point.

The smart component device method embodiment further comprising connecting to a master database 104 that is remote to the master transmitter device 102. This embodiment further envisions wherein the master database 104 contains predefined master attributes. Optionally, this could further comprise attaching a new component 120 that possesses a new component definition, transmitting that new component definition to the master database 104, and generating a record of the new component definition in the master database 104. Additionally, this could comprise using the new component definition in the master database 104 for additional components introduced to the master database 104 that also have the new component definition.

Another embodiment contemplates a master communications device 102 comprising: a microprocessor 218 connected to non-transitory memory 214 which together comprise an agnostic value generator engine, a universal data transmission scheme 402 and 404, and a device arrangement data packet generator; a device data packet defined by a device definition 400 and device indicia, the device data packet retained in the non-transitory memory 214, the device definition 400 includes information about at least one on-board component, e.g., 208; means for connecting the master communications device 102 to a centralized database 104; at least one component connector 210A configured to connect with an external smart sensor component 115, the external smart sensor component 115 connected to the master communications device 102 defines a master communications device arrangement 702, the agnostic value generator engine configured to convert a sensor value 802 received from the smart sensor component 115 into an agnostic value 804 consisting of one of a predefined range of numerical values 806, the device arrangement data packet generator configured to generate a device arrangement data packet that comprises the device data packet including a sensor component definition data packet 350, the sensor component definition data packet 350 includes a sensor component definition 354 and at least one sensor component indicium 352, the sensor component definition data packet 350 includes a conversion algorithm specific to the external smart sensor component 115 that is arranged to be used by the agnostic value generator engine to convert the sensor value 802 into the agnostic value 804.

The master communications device embodiment further imagining wherein the means for connecting is adapted to transmit the device arrangement data packet to the centralized database 102, the centralized database configured to construct a communications database specifically 750 for the master communications device arrangement 702 in the centralized database 104.

The master communications device embodiment further contemplating wherein the universal data transmission scheme includes the device indicia, a timestamp entry, and the agnostic value 804. Additionally, the centralized database 104 could be configured to create a record of a data transmission from the master communications device 104 that includes the device indicia, the timestamp entry of when the sensor value was taken, and a converted sensor value 809 that is obtained by reversing the agnostic value 804 using the conversion algorithm at the centralized database 104. Optionally, the centralized database 104 is configured to create a record of a data transmission from the master communications device 102 that includes the device indicia, a timestamp entry of when the agnostic value was taken, and the agnostic value.

The master communications device embodiment further considering wherein the at least one on-board component is selected from a set comprising: a sensor, a battery, a GPS, an action producing device, and a cellular communications device.

The master communications device embodiment further contemplating wherein the device indicia is selected from a set comprising: a part number, a manufacture, a serial number, and a device ID.

The master communications device embodiment further imagining wherein the microprocessor 218 connected to the non-transitory memory 214 together further comprise a hash function generator configured to generate a hash function 'xyz' of the device definition 406 and the component definition data packet 350. The hash function 'xyz' can further be adapted to be compared against a library of hash functions 506 in the centralized database 104 for purposes of constructing a communications database 750 specifically for the master communications device arrangement 702 in the centralized database 104.

The master communications device embodiment further comprising an independent power source 216.

Another embodiment contemplates a master communications device arrangement 702 comprising: a master communications device 102 that possesses a microprocessor 218 and a non-transitory memory 214; a first external sensor component 115 linked to the master communications device 102; an arrangement definition 400 that is stored in the non-transient memory, the arrangement definition including a) a device definition 406 of attributes corresponding to logical elements in or on the master communications device, and b) a component definition data packet 350 of attributes corresponding to at least one sensor 306 comprised by the first external sensor component 115 and a first sensor agnostic value conversion algorithm 354 corresponding to the first external sensor component 115, the algorithm 354 executable by the microprocessor 218 to convert any sensor value 802 received from the first external sensor component 115 to a dimensionless agnostic value 804 consisting of one of a predefined range of numerical values 806; an arrangement data packet 400 that includes the arrangement definition, at least one indicium corresponding to the master communications device 102, and at least one indicium corresponding to the first external sensor 115.

The master communications device arrangement embodiment further considering wherein the master communications device 102 further comprises a wireless transceiver 204 adapted to communicatively connect to a master database 104 hosted in one or more servers.

The master communications device arrangement embodiment 702 further contemplating wherein the arrangement data packet 400 is adapted to be transmitted to the master database 104 where the master database 104 is configured to construct a data acquisition file 750 uniquely for the master communications device arrangement 702. This embodiment can further comprise a hash algorithm contained in the non-transitory memory 218, the hash algorithm configured to generate a hash 'xyz' of the arrangement definition. This is further contemplated wherein the arrangement definition hash 'xyz' is adapted to be sent to a master database 104 and compared against a plurality of hash entries maintained in a hash library 506 in the master database 104 when setting up an arrangement database 750 specifically for the master communications device arrangement 702. Optionally, the master communications device arrangement 702 can further comprises a new external sensor component 120 that possesses a new component definition, the new external device is connected with the master communications device arrangement 702 after the data acquisition file 750 is constructed, a record of the new component definition adapted to be generated in the master database 104. Additionally, the new component definition record can be adapted to be used for other components connected to the master database that possess the new component definition.

Still some embodiments envision a computing device comprising: a microcontroller 218 and a non-transitory memory 214; a plurality of sensor devices 115, 120; a computing device definition 406 comprising a plurality of sensor device definitions 350, 353 each from a corresponding sensor device of the plurality of sensor devices 115, 120, each of the sensor device definitions 350, 353 including a plurality of parameters describing the corresponding sensor device 115, 120 and a sensor agnostic value conversion algorithm 354 that is executable by the microprocessor 218 to convert any corresponding sensor value 802 obtained by the corresponding sensor device 115, 120 to a dimensionless agnostic value 804 consisting of one of a predefined range of numerical values 806; and a computing device data packet 400 that includes the computer device definition and indicia 350, 353, 406 from the computing device 102 and the plurality of sensor devices 115, 120.

Still yet other embodiment contemplate a method for organizing agnostic sensor data at a master database 104, the method comprising: connecting the master database 104 with a master communications device arrangement 702; at the master database 104, receiving a communications arrangement data packet 400 containing arrangement indicia and arrangement attribute information; building a database definition 400 at 750 for the master communications device arrangement 702 in the master database 104 based on the communications arrangement data packet 400, the database definition 400 at 750 including the arrangement indicia, attribute definitions and a conversion algorithm 350 associated with a component 115 attached to a master communications device 102; receiving a data entry packet from the master communications device 102 corresponding to a sensor value 802 obtained by the component 115, the data entry packet including a dimensionless universal data value 804, a timestamp, and indicia related to the component 115; entering a record 916 for the data entry packet in the master database 104 according to the database definition 400 at 750 for the master communications device 102; converting the first dimensionless universal data value 804 essentially into the sensor value 809; tagging the sensor value 809 with a dimension maintained by the database definition 400 at 750; and displaying a display version of the record 916 that includes the sensor value 809 with dimensions to an end-user 106.

This method embodiment further considering wherein the arrangement attribute information is a hash value 'xyz' of an arrangement definition 400. This can further comprise finding the hash value 'xyz' from a plurality of pre-existing hash values 506 retained in the master database 104. This can further comprise identifying a pre-existing database definition in the master database 104 that includes the attribute definitions and the conversion algorithm associated with the component 115 wherein the building step is accomplished via the pre-existing database definition.

This method embodiment further imagining wherein the arrangement attribute information includes the attribute definitions 404, 408, the attribute definitions 404, 408 includes optional parameters adjustable by an end-user 106.

This method embodiment further comprising entering in the first dimensionless universal data value 804 in the record 916.

This method embodiment further comprising entering in the sensor value 809 in the record 916, the entering step occurring after the converting step. This can further comprise entering in the dimension maintained by the database definition 400 at 750 in the record 916.

This method embodiment further envisioning wherein the record 916 is in a table 900 that includes other records 1012 from other master communications devices arrangement 702, the database definition 400 at 750 for the master communications device arrangement 702 points to the record 916 but does not point to the other records 1012.

This method embodiment further comprising receiving a second data entry packet from the master communications device 102 corresponding to a second sensor value obtained from a second component 120, the second component also attached to the master communications device 102, the second data entry packet including a second dimensionless universal data value, a second timestamp, and a second indicia related to the second component; entering the second record 1004 for the second data entry packet in the master database 104 corresponding to the database definition 400 at 750 for the master communications device arrangement 702; converting the second dimensionless universal data value 804 essentially into the second data value 809 via a second conversion algorithm associated with the second component 120. This can further include wherein the record 916 and the second record 1004 are in a table 900 that includes other records 1008 from other master communications devices 1060, the database definition 400 at 750 for the master communication device 102 points to the record 916 and the second record 1004 but does not point to the other records 1008.

The method of embodiment further comprising at the master database 104 receiving a component data packet from a component 120 newly attached to the master communications device 102, the component data packet including a new component definition not known to the master database 104, and building a record of the new component definition in the master database 104. This can further comprise using the new component definition 751 in the master database 104 for additional components introduced to the master database 104 that are also defined by the new component definition 751.

The above embodiments are not intended to be limiting to the scope of the invention whatsoever because many more embodiments are easily conceived within the teachings and scope of the instant specification. Moreover, the corresponding elements in the above example should not be considered limiting.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, though a master communications device is used for illustrative purposes herein, the discussed inventive concepts can be applied equally to a computer microprocessor chip and memory serving comparable functionality. Another example is the inventive concepts herein can be applied equally to various database configurations be it a unique definition file pointing to corresponding records and one or more common tables or an independent database or some hybrid without departure from the scope and spirit of the present invention. Yet another example is the management of the database whereby a family of communications devices can comprise their own database and entries in the database without departing from the scope and spirit of the present invention. Additionally, components internal to a communications device such as motors, batteries, capacitors, lights, etc., can all produce data that can be transformed into universal dimensionless agnostic values transferred to and maintained within a data acquisition database without departing from the scope and spirit of the present invention. Further, the terms "one" is synonymous with "a", which may be a first of a plurality.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A master communications device comprising:
    a microprocessor connected to a non-transitory memory;
    a device data packet retained in the non-transitory memory, the device data packet includes a device definition, a device indicia, and information about at least one on-board component;
    means for connecting the master communications device to a centralized database;
    at least one component connector configured to connect with an external sensor component, the external sensor component containing a component conversion algorithm that is transferred to the master communications device upon initially connecting therewith,
    the microprocessor configured to convert a sensor value received from the external sensor component into an agnostic value consisting of one of a predefined range of numerical values as defined by the component conversion algorithm,
    combination of the external sensor component when connected with the master communications device defines a master communications device arrangement.

2. The master communications device of claim 1 further comprising a device arrangement data packet generator configured to generate a device arrangement data packet that comprises the device data packet and a sensor component data packet, the sensor component data packet includes a sensor component definition and at least one sensor component indicium.

3. The master communications device of claim 2 wherein the means for connecting is adapted to transmit the device arrangement data packet to the centralized database, the centralized database configured to construct a communications database specifically for the master communications device arrangement in the centralized database.

4. The master communications device of claim 3 wherein the master communications device arrangement includes the device indicia, a timestamp entry, and the agnostic value.

5. The master communications device of claim 2 wherein the centralized database is configured to create a record of a data transmission from the master communications device that includes the device indicia, a timestamp entry of when the agnostic value was taken, and the agnostic value.

6. The master communications device of claim 1 wherein the centralized database is configured to create a record of a data transmission from the master communications device that includes the device indicia, a timestamp entry of when the sensor value was taken, and a converted sensor value that is obtained by reversing the agnostic value using the conversion algorithm at the centralized database.

7. The master communications device of claim 1 wherein the agnostic value is defined as having a dimensionless universal scale and offset.

8. The master communications device of claim 1 wherein the at least one on-board component is selected from a set comprising a sensor, a battery, a GPS, an action producing device, and a cellular communications device.

9. The master communications device of claim 1 wherein the microprocessor connected to the non-transitory memory together further comprise a hash function generator configured to generate a hash function of the device definition and a sensor component definition, the hash function is adapted to be compared against a library of hash functions in the centralized database for purposes of constructing a communications database specifically for the master communications device arrangement in the centralized database.

10. A master communications device arrangement comprising:
 a master communications device that possesses a microprocessor and a non-transitory memory;
 a first external sensor component linked to the master communications device;
 an arrangement definition that is stored in the non-transient memory, the arrangement definition including a) a device definition of attributes corresponding to logical elements in or on the master communications device, and b) a component definition of attributes corresponding to at least one sensor comprised by the first external sensor component and a first sensor agnostic value conversion algorithm corresponding to the first external sensor component, the algorithm executable by the microprocessor to convert any sensor value received from the first external sensor component to a dimensionless agnostic value consisting of one of a predefined range of numerical values;
 an arrangement data packet that includes the arrangement definition, at least one indicium corresponding to the master communications device, and at least one indicium corresponding to the first external sensor.

11. The master communications device arrangement of claim 10 wherein the arrangement data packet is configured to be transmitted to a master database where the master database is configured to construct a data acquisition file uniquely for the master communications device arrangement.

12. The master communications device arrangement of claim 10 further comprising a hash algorithm that generates a hash of the arrangement definition, the hash algorithm contained in the non-transitory memory.

13. The master communications device arrangement of claim 12 wherein the arrangement definition hash is configured to be sent to a master database and compared against a plurality of hash entries maintained in a hash library in the master database when setting up an arrangement database specifically for the master communications device arrangement.

14. The master communications device arrangement of claim 12 further comprises a new external sensor component that possesses a new component definition, the new external sensor component is connected with the master communications device arrangement after a data acquisition file is constructed, a record of the new component definition adapted to be generated in a master database.

15. The master communications device arrangement of claim 14 wherein the new component definition record is adapted to be used for other components connected to the master database that possess the new component definition.

16. A computing device comprising:
 a microcontroller and a non-transitory memory;
 a plurality of sensor devices;
 a computing device definition comprising a plurality of sensor device definitions each from a corresponding sensor device of the plurality of sensor devices, each of the sensor device definitions including a plurality of parameters describing the corresponding sensor device and a sensor agnostic value conversion algorithm that is executable by the microcontroller to convert any corresponding sensor value obtained by the corresponding sensor device to a dimensionless agnostic value consisting of one of a predefined range of numerical values; and
 a computing device data packet that includes the computer device definition and indicia from the computing device and the plurality of sensor devices.

17. The computing device of claim 16 wherein the computing device data packet is configured to be transmitted to a master database where the master database is configured to construct a data acquisition file uniquely for the computing device in a master communications device arrangement.

18. The computing device of claim 16 further comprising a hash algorithm that generates a hash of an arrangement definition, the hash algorithm contained in the non-transitory memory.

19. The computing device of claim 18 wherein the hash of the arrangement definition is configured to be sent to a master database and compared against a plurality of hash entries maintained in a hash library in the master database when setting up an arrangement database specifically for the computing device.

* * * * *